(12) United States Patent
Hiramatsu et al.

(10) Patent No.: US 7,381,672 B2
(45) Date of Patent: *Jun. 3, 2008

(54) DIELECTRIC CERAMIC MATERIAL AND MULTILAYER CERAMIC CAPACITOR

(75) Inventors: Takashi Hiramatsu, Kusatsu (JP); Teppei Akiyoshi, Shiga-ken (JP); Masahiro Otsuka, Yasu (JP)

(73) Assignee: Murata Manufacturing Co., Ltd (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/649,249

(22) Filed: Jan. 4, 2007

(65) Prior Publication Data

US 2007/0135294 A1    Jun. 14, 2007

Related U.S. Application Data

(63) Continuation of application No. PCT/JP05/08446, filed on May 9, 2005.

(30) Foreign Application Priority Data

Jul. 5, 2004    (JP) .............................. 2004-198588

(51) Int. Cl.
    *C04B 35/468*    (2006.01)
    *H01G 4/06*    (2006.01)
(52) U.S. Cl. .................... 501/138; 501/139; 361/321.4
(58) Field of Classification Search ................ 501/138, 501/139; 361/321.4
    See application file for complete search history.

(56) References Cited

U.S. PATENT DOCUMENTS 6,380,116 B1 *    4/2002    Okamatsu et al. .......... 501/138

7,160,827 B2 *    1/2007    Banno .......................... 501/138
7,239,501 B2 *    7/2007    Hiramatsu et al. ........ 361/321.4
7,271,115 B2 *    9/2007    Suzuki ........................ 501/138
7,273,825 B2 *    9/2007    Muto et al. ................. 501/138
2007/0123413 A1 *    5/2007    Suzuki ........................ 501/138

FOREIGN PATENT DOCUMENTS

| JP | 5-9066 | 1/1993 |
| JP | 5-9067 | 1/1993 |
| JP | 5-9068 | 1/1993 |
| JP | 2001-39765 | 2/2001 |
| JP | 2001-143955 | 5/2001 |

OTHER PUBLICATIONS

Written Opinion of the International Searching Authority dated May 7, 2005.

* cited by examiner

*Primary Examiner*—Karl E Group
(74) *Attorney, Agent, or Firm*—Dickstein, Shapiro, LLP.

(57) ABSTRACT

A dielectric ceramic material comprising the composition: $100(Ba_{1-x}Ca_x)_mTiO_3+aMnO+bCuO+cSiO_2+dMgO+eRO$ (wherein coefficients 100, a, b, c, d, and e each represent mols; m represents the molar ratio of $(Ba_{1-x}Ca_x)$ to Ti; and RO represents at least one rare-earth element oxide selected from $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$), wherein m, x, a, b, c, d, and e satisfy the relationships: $0.998 \leq m \leq 1.030$, $0.04 \leq x \leq 0.15$, $0.01 \leq a \leq 5$, $0.05 \leq b \leq 5$, $0.2 \leq c \leq 8$, $0.05 \leq d \leq 3.0$, and $0.05 \leq e \leq 2.5$, and the dielectric ceramic material has an average grain size of 0.3 μm to 0.7 μm, is used to make reliable multilayer ceramic capacitors including dielectric ceramic layers each having a small thickness of about 1 μm.

19 Claims, 1 Drawing Sheet

DIELECTRIC CERAMIC MATERIAL AND MULTILAYER CERAMIC CAPACITOR

This is a continuation of application Ser. No. PCT/JP2005/008446, filed May 9, 2005.

TECHNICAL FIELD

The present invention relates to dielectric ceramic materials and multilayer ceramic capacitors. The present invention also relates to a dielectric ceramic material capable of constituting a dielectric ceramic layer having a thickness as small as about 1 μm and relates to a multilayer ceramic capacitor that can be produced at low cost.

BACKGROUND ART

It is known that Patent Documents 1, 2, 3, 4, and the like disclose such dielectric ceramic materials.

Patent Documents 1, 2 and 3 each disclose an non-reducible dielectric ceramic composition. Each of the non-reducible dielectric ceramic compositions basically contains 92.0 to 99.4 mol % $BaTiO_3$, 0.3 to 4 mol % $Re_2O_3$ (wherein Re represents at least one rare-earth element selected from Tb, Dy, Ho and Er), and 0.3 to 4 mol % $Co_2O_3$, which are main components, and contains 0.2 to 4 mol % BaO, 0.2 to 3 mol % MnO, and 0.5 to 5 mol % MgO, which are accessory components.

Each of the non-reducible dielectric ceramic compositions is not converted into a semiconductor even when the compositions are fired at a low oxygen partial pressure and has a dielectric constant $\epsilon_r$ of 3000 or more and a resistivity ρ of $10^{11.0}$ Ωm or more. Furthermore, temperature characteristics of the relative dielectric constant $\epsilon_r$ is in the range of ±15% at a wide temperature range between −55° C. and +125° C. with reference to a capacitance value at 25° C.

Patent Document 4 discloses a dielectric ceramic composition and a multilayer ceramic capacitor. The dielectric ceramic composition contains barium titanate as a main component and Re (wherein Re represents at least one rare-earth element selected from Y, Sm, Eu, Gd, Tb, Dy, Ho, Er, Tm and Yb), Ca, Mg and Si as accessory components. The dielectric ceramic material is represented by the composition: $100Ba_mTiO_3+aReO_{3/2}+bCaO+cMgO+dSiO_2$ (wherein coefficients 100, a, b, c, and d each represent a mols), and satisfy the respective relationships: $0.990 \leq m \leq 1.030$, $0.5 \leq a \leq 6.0$, $0.10 \leq b \leq 5.00$, $0.010 \leq c \leq 1.000$, and $0.05 \leq d \leq 2.00$.

The dielectric ceramic composition has a relative dielectric constant $\epsilon_r$ of 3000 or more, satisfies B characteristics specified by JIS and X7R characteristics specified by EIA, and has a long accelerated life of insulation resistance at high temperatures and high voltages, thus resulting in excellent reliability even when a layer composed of the dielectric ceramic composition has a small thickness.

Patent Document 1: Japanese Unexamined Patent Application Publication No. 5-9066

Patent Document 2: Japanese Unexamined Patent Application Publication No. 5-9067

Patent Document 3: Japanese Unexamined Patent Application Publication No. 5-9068

Patent Document 4: Japanese Unexamined Patent Application Publication No. 2001-39765

DISCLOSURE OF INVENTION

Problems to be Solved by the Invention

In recent years, however, with developments in electronics, rapid progress has been made in the miniaturization of electronic components, and trends toward miniaturization and higher capacities of multilayer ceramic capacitors have become significant. Accordingly, the demand for a high-reliability dielectric ceramic composition having a high dielectric constant, a low change in dielectric constant with temperature, and high insulation performance even when the composition is formed into a thin layer have been growing. However, the known dielectric ceramic compositions have been designed on the premise that the compositions are used under low electric field strength conditions. When used at high electric field strength, disadvantageously, insulation resistance, dielectric strength, and reliability are significantly degraded. Furthermore, the compositions have a relative dielectric constant as low as about 3000, which is insufficient for the demand for miniaturization and higher capacitance. Thus, a ceramic dielectric layer having a smaller thickness requires a lower rated voltage in response to the thickness in the known dielectric ceramic compositions.

In each of the dielectric ceramic compositions disclosed in Patent Documents 1 to 4, it is possible to provide a high-reliability multilayer ceramic capacitor including dielectric ceramic layers each composed of one of the dielectric ceramic compositions. However, when a dielectric ceramic layer has a small thickness of about 1 μm, disadvantageously, it is difficult to ensure the reliability of the multilayer ceramic capacitor.

Furthermore, there is the problem of production costs of the multilayer ceramic capacitor. To reduce the production costs, the amount of electrical energy used for heating in a firing step needs to be minimized. An increase in the number of the multilayer ceramic capacitors fired at the same time results in a reduction in the amount of electrical energy per multilayer ceramic capacitor, thus reducing the production costs. In the case where many multilayer ceramic capacitors are fired at the same time, the temperature inside a firing furnace needs to be controlled so as to be completely uniformized. However, the control cannot be performed in the present circumstances, thus resulting in nonuniformity in capacitance and insulation resistance due to temperature distribution in the firing furnace, causing problems in quality.

It is an object of the present invention to overcome the problems and to provide a high-reliability dielectric ceramic material and a high-reliability multilayer ceramic capacitor having a high relative dielectric constant $\epsilon_r$ of 5000 or more, a low dielectric loss (tan δ) of 10.0% or less, temperature characteristics of the dielectric constant satisfying X6S characteristics (the rate of capacitance change with reference to a capacitance at 25° C. is in the range of ±22% at temperatures between −25° C. and +105° C.), a high resistivity ρ of $10^{10.5}$ Ωm or more, and a mean time to failure of 100 hours or more in an accelerated reliability test (150° C., DC field strength: 6 V/μm), even at a small thickness of a dielectric ceramic layer of about 1 μm, the multilayer ceramic capacitor being capable of being produced at low cost.

Furthermore, it is another object of the present invention to provide a high-reliability dielectric ceramic material and a high-reliability multilayer ceramic capacitor having a high relative dielectric constant $\epsilon_r$ of 6000 or more, a low dielectric loss (tan δ) of 10.0% or less, temperature characteristics of the dielectric constant satisfying X5R characteristics (the rate of capacitance change with reference to a capacitance at 25° C. is in the range of ±15% at temperatures between −25° C. and +85° C.), a high resistivity ρ of $10^{10.5}$ Ωm or more, and a mean time to failure of 100 hours or more in an accelerated reliability test (125° C., DC field strength: 8 V/μm), the multilayer ceramic capacitor being capable of being produced at low cost.

MEAN FOR SOLVING THE PROBLEMS

According to a first aspect of the present invention, there is provided a dielectric ceramic material comprising the composition: $100(Ba_{1-x}Ca_x)_mTiO_3+aMnO+bCuO+cSiO_2+dMgO+eRO$ (wherein coefficients 100, a, b, c, d, and e each represent mols; m represents the molar ratio of $(Ba_{1-x}Ca_x)$ to Ti; and RO represents at least one rare-earth element oxide selected from $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$), wherein m, x, a, b, c, d and e satisfy the relationships: $0.998 \leq m \leq 1.030$, $0.04 \leq x \leq 0.15$, $0.01 \leq a \leq 5$, $0.05 \leq b \leq 5$, $0.2 \leq c \leq 8$, $0.05 \leq d \leq 3.0$, and $0.05 \leq e \leq 2.5$, and the dielectric ceramic material has an average grain size of 0.3 μm to 0.7 μm.

According to a second aspect of the present invention, there is provided a dielectric ceramic material comprising the composition: $100(Ba_{1-x}Ca_x)_mTiO_3+aMnO+bCuO+cSiO_2+dMgO+eRO$ (wherein coefficients 100, a, b, c, d, and e each represent mols; m represents the molar ratio of $(Ba_{1-x}Ca_x)$ to Ti; and RO represents at least one rare-earth element oxide selected from $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$), wherein m, x, a, b, c, d and e satisfy the relationships: $0.998 \leq m \leq 1.030$, $0 \leq x < 0.04$, $0.01 \leq a \leq 5$, $0.05 \leq b \leq 5$, $0.2 \leq c \leq 8$, $0.05 \leq d \leq 3.0$, and $0.05 \leq e \leq 2.5$, and the dielectric ceramic material has an average grain size of 0.35 μm to 0.65 μm.

According to a third aspect of the present invention, there is provided a multilayer ceramic capacitor comprising a plurality of dielectric ceramic layers, the dielectric ceramic layers being laminated; internal electrodes, each being disposed between dielectric ceramic layers; and external electrodes, each electrically connected to a corresponding one of the internal electrodes, wherein the dielectric ceramic layers are each composed of the dielectric ceramic material according to the first or second aspect.

According to a fourth aspect of the present invention, in the multilayer ceramic capacitor according to the third aspect of the present invention, the internal electrodes are each composed of at least one conductive material selected from among nickel, nickel alloys, copper, and copper alloys.

Advantages

According to the first, third, and fourth aspects of the present invention, it is possible to provide a high-reliability dielectric ceramic material and a high-reliability multilayer ceramic capacitor having a high relative dielectric constant $\epsilon_r$ of 5000 or more, a low dielectric loss (tan δ) of 10.0% or less, temperature characteristics of the dielectric constant satisfying X6S characteristics (the rate of capacitance change with reference to a capacitance at 25° C. is in the range of ±22% at temperatures between −25° C. and +105° C.), a high resistivity ρ of $10^{10.5}$ Ωm or more, and a mean time to failure of 100 hours or more in an accelerated reliability test (150° C., DC field strength: 6 V/μm), even at a small thickness of a dielectric ceramic layer of about 1 μm, the multilayer ceramic capacitor being capable of being produced at low cost.

According to the second, third, and fourth aspects of the present invention, it is possible to provide a high-reliability dielectric ceramic material and a high-reliability multilayer ceramic capacitor having a high relative dielectric constant $\epsilon_r$ of 6000 or more, a low dielectric loss (tan δ) of 10.0% or less, temperature characteristics of the dielectric constant satisfying X5R characteristics (the rate of capacitance change with reference to a capacitance at 25° C. is in the range of ±15% at temperatures between −25° C. and +85° C.), a high resistivity ρ of $10^{10.5}$ Ωm or more, and a mean time to failure of 100 hours or more in an accelerated reliability test (125° C., DC field strength: 8 V/μm), the multilayer ceramic capacitor being capable of being produced at low cost.

Figure 1:
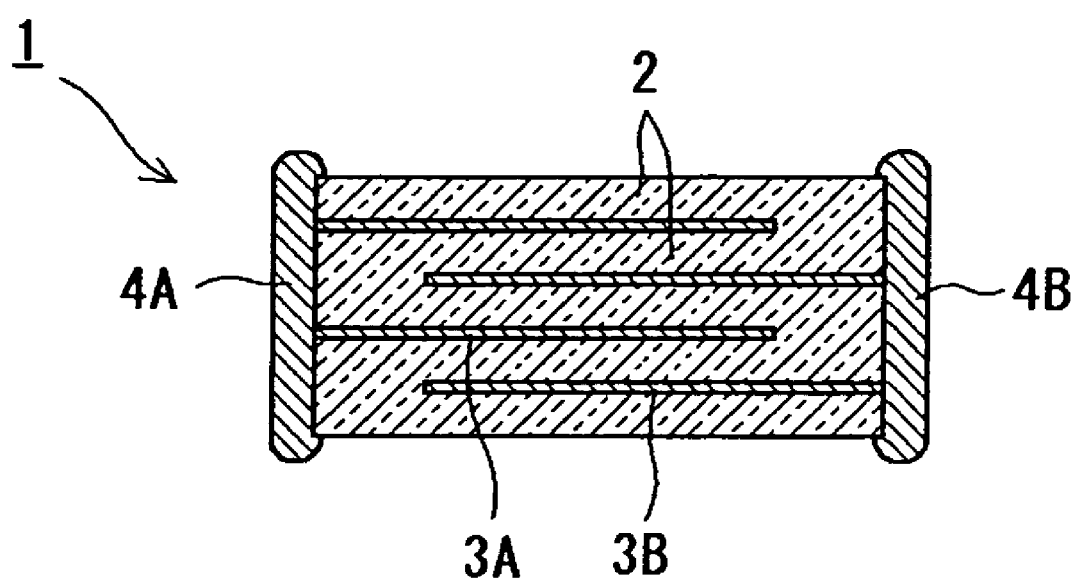
FIG. 1 is a cross-sectional view of a multilayer ceramic capacitor according to an embodiment of the present invention.

REFERENCE NUMERALS 1 multilayer ceramic capacitor
2 dielectric ceramic layers
3A, 3B first and second internal electrodes
4A, 4B first and second external electrodes

BEST MODE FOR CARRYING OUT THE INVENTION

An embodiment of the present invention will be described below with reference to FIG. 1. As shown in FIG. 1, for example, a multilayer ceramic capacitor 1 in this embodiment includes a laminate having a plurality of dielectric ceramic layers 2 (five layers in this embodiment), a plurality of first internal electrodes 3A, and a plurality of second internal electrodes 3B, the first and second internal electrodes 3A and 3B being disposed between the dielectric ceramic layers 2; a first external electrode 4A electrically connected to the first internal electrodes 3A; and a second external electrode 4B electrically connected to the second internal electrodes 3B, the first and second external electrodes 4A and 4B being disposed at both ends of the laminate.

As shown in FIG. 1, each first internal electrode 3A extends from one end of a corresponding one of the dielectric ceramic layers 2 (left end in FIG. 1) to the vicinity of the other end thereof (right end). Each second internal electrode 3B extends from the right end of a corresponding one of the dielectric ceramic layers 2 to the vicinity of the left end thereof. The first and second internal electrodes 3A and 3B are each composed of a conductive material. Examples of the conductive material that can be preferably used include a base metal selected from nickel, nickel alloys, copper, and copper alloys. Furthermore, a small amount of a ceramic powder may be incorporated in the conductive material in order to prevent the structural defects in the internal electrodes.

As shown in FIG. 1, the first external electrode 4A is electrically connected to the first internal electrodes 3A in the laminate. The second external electrode 4B is electrically connected to the second internal electrodes 3B in the laminate. Each of the first and second external electrodes 4A and 4B may be composed of any one of the known conductive materials, such as Ag and Cu. Each of the first and second external electrodes 4A and 4B may be appropriately formed by a known process.

Each of the dielectric ceramic layers 2 is composed of dielectric ceramic material (1) or dielectric ceramic material (2).

Dielectric ceramic material (1) according to the present invention has the composition: $100(Ba_{1-x}Ca_x)_mTiO_3 + aMnO + bCuO + cSiO_2 + dMgo + eRO$ (wherein coefficients 100, a, b, c, d, and e each represent a mols; m represents the molar ratio of $(Ba_{1-x}Ca_x)$ to Ti; and RO represents at least one rare-earth element oxide selected from $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$), wherein m, x, a, b, c, d, and e satisfy the relationships: $0.998 \leq m \leq 1.030$, $0.04 \leq x \leq 0.15$, $0.01 \leq a \leq 5$, $0.05 \leq b \leq 5$, $0.2 \leq c \leq 8$, $0.05 \leq d \leq 3.0$, and $0.05 \leq e \leq 2.5$, and the dielectric ceramic material (1) has an average grain size of 0.3 µm to 0.7 µm.

In dielectric ceramic material (1), $(Ba_{1-x}Ca_x)_mTiO_3$ is a component in which Ba ions in barium titanate are partially replaced with Ca ions. At a substitution rate x of Ca ions to Ba ions of less than 0.04 (substitution rate: less than 4%), the mean time to failure in a high-temperature load test is reduced to less than 100 hours. At a substitution rate x exceeding 0.15 (substitution rate: 15%), the relative dielectric constant is reduced to less than 5000, and the rate of change of the dielectric constant with temperature deviates from the range of ±22%. At a ratio of $Ba_{1-x}Ca_x$ to Ti ($m=Ba_{1-x}Ca_x/Ti$) of less than 0.998, the resistivity is reduced to less than $10^{10.5}$ Ωm. At m exceeding 1.030, the relative dielectric constant is reduced to less than 5000, the rate of change of the dielectric constant with temperature deviates from the range of ±22%, the resistivity is reduced to less than $10^{10.5}$ Ωm, and the mean time to failure is reduced.

At a molar amount a of MnO of less than 0.01 relative to 100 of $(Ba_{1-x}Ca_x)_mTiO_3$, the resistivity is reduced to less than $10^{10.5}$ Ωm. At a molar ratio a exceeding 5, the rate of change of the dielectric constant with temperature deviates from the range of ±22%, and the resistivity is reduced to less than $10^{10.5}$ Ωm.

At a molar amount b of CuO of less than 0.05, the relative dielectric constant is reduced to less than 5000, and the mean time to failure is reduced to less than 100 hours. Furthermore, MnO particles each having a size of 1 µm or more are segregated to degrade the uniformity in MnO distribution, thus not resulting in a synergistic effect of uniformizing the MnO distribution. At a molar amount b exceeding 5, the rate of change of the dielectric constant with temperature deviates from the range of ±22%.

At a molar amount C of $SiO_2$ of less than 0.2, the relative dielectric constant is reduced to less than 5000, the dielectric loss is increased to more than 10%, the rate of change of the dielectric constant with temperature deviates from the range of ±22%, the resistivity is reduced to less than $10^{10.5}$ Ωm, and the mean time to failure is reduced to less than 100 hours. At a molar amount c exceeding 8, the rate of change of the dielectric constant with temperature exceeds 22%, and the mean time to failure is reduced to less than 100 hours.

At a molar amount d of MgO less than 0.05, the grain size is increased, the change in relative dielectric constant when the firing temperature is changed by 60° C. is increased to 1000 or more, thus resulting in nonuniformity in electrical properties due to temperature distribution in firing. At a molar amount d exceeding 3, the relative dielectric constant is reduced to less than 5000.

At a molar amount e of RO less than 0.05, the mean time to failure is reduced to less than 100 hours. At a molar amount exceeding 2.5, the rate of change of the dielectric constant with temperature deviates from the range of ±22%. When a plurality of types of the rare-earth element oxides RO are present, the total of molar amounts of the rare-earth element oxides RO may be defined as d.

At an average grain size of ceramic grains of less than 0.3 µm, the relative dielectric constant is reduced to less than 5000. At an average grain size exceeding 0.7 µm, the dielectric loss exceeds 10%, and the rate of change of the dielectric constant with temperature deviates from the range of ±22%.

On the other hand, the dielectric ceramic material (2) is comprising the composition: $100(Ba_{1-x}Ca_x)_mTiO_3 + aMnO + bCuO + cSiO_2 + dMgO + eRO$ (wherein coefficients 100, a, b, c, d, and e each represent mols; m represents the molar ratio of $(Ba_{1-x}Ca_x)$ to Ti; and RO represents at least one rare-earth element oxide selected from $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$), wherein m, x, a, b, c, d and e satisfy the relationships: $0.998 \leq m \leq 1.030$, $0 \leq x \leq 0.04$, $0.01 \leq a \leq 5$, $0.05 \leq b \leq 5$, $0.2 \leq c \leq 8$, $0.05 \leq d \leq 3.0$, and $0.05 \leq e \leq 2.5$, and the dielectric ceramic material has an average grain size of 0.35 µm to 0.65 µm.

In dielectric ceramic material (2), $(Ba_{1-x}Ca_x)_mTiO_3$ is a component in which Ba ions in barium titanate are partially replaced with Ca ions. At a substitution rate x of Ca ions to Ba ions of 0.04 or more, the relative dielectric constant is reduced to less than 6000. At a ratio of $Ba_{1-x}Ca_x$ to Ti ($m=Ba_{1-x}Ca_x/Ti$) of less than 0.998, the resistivity is reduced to less than $10^{10.5}$ Ωm. At m exceeding 1.030, the relative dielectric constant is reduced to less than 6000, the rate of change of the dielectric constant with temperature deviates from the range of ±15%, and the mean time to failure is reduced.

At a molar amount a of MnO of less than 0.01 relative to 100 of $(Ba_{1-x}Ca_x)_mTiO_3$, the resistivity is reduced to less than $10^{10.5}$ Ωm. At a molar amount a exceeding 5, the rate of change of the dielectric constant with temperature deviates from the range of ±15%, and the resistivity is reduced to less than $10^{10.5}$ Ωm.

At a molar amount b of CuO of less than 0.05, the relative dielectric constant is reduced to less than 6000, and the mean time to failure is reduced to less than 100 hours. Furthermore, MnO particles each having a size of 1 µm or more are segregated to degrade the uniformity in MnO distribution, thus not resulting in a synergistic effect of uniformizing the MnO distribution. At a molar amount b exceeding 5, the rate of change of the dielectric constant with temperature deviates from the range of ±15%.

At a molar amount c of $SiO_2$ of less than 0.2, the relative dielectric constant is reduced to less than 6000, the dielectric loss is increased to more than 10%, the rate of change of the dielectric constant with temperature deviates from the range of ±15%, the resistivity is reduced to less than $10^{10.5}$ Ωm, and the mean time to failure is reduced to less than 100 hours. At a molar amount c exceeding 8, the mean time to failure is reduced to less than 100 hours.

At a molar amount d of MgO less than 0.05, the grain size is increased, the change in relative dielectric constant when the firing temperature is changed by 60° C. is increased to 1000 or more, thus resulting in the nonuniformity in electrical properties due to temperature distribution in firing. At a molar amount d exceeding 3, the relative dielectric constant is reduced to less than 6000.

At a molar amount e of RO less than 0.05, the mean time to failure is reduced to less than 100 hours. At a molar amount e exceeding 2.5, the rate of change of the dielectric constant with temperature deviates from the range of ±15%. When a plurality of types of the rare-earth element oxides RO are contained, the total of molar amounts of the rare-earth element oxides RO may be defined as e.

At an average grain size of ceramic grains of less than 0.35 μm, the relative dielectric constant is reduced to less than 6000. At an average grain size exceeding 0.65 μm, the rate of change of the dielectric constant with temperature deviates from the range of ±15%.

A process for producing a material powder used for dielectric ceramic materials (1) and (2) is not particularly limited, and any production process may be employed as long as the compound represented by $(Ba_{1-x}Ca_x)_mTiO_3$ can be prepared.

For example, the compound represented by $(Ba_{1-x}Ca_x)_mTiO_3$ may be produced by a step of mixing $BaCO_3$, $TiO_2$ and $CaCO_3$ and then a step of reacting the $BaCO_3$, $TiO_2$ and $CaCO_3$ by heat treatment.

The material powder of the dielectric ceramic material may be produced by a step of mixing the compound represented by $(Ba_{1-x}Ca_x)_mTiO_3$ and additional components, i.e., oxides of each Mn, Cu, Si and Mg, and RO (wherein RO represents at least one rare-earth element oxide selected from $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$).

Furthermore, examples of the production process of the compound represented by $(Ba_{1-x}Ca_x)_mTiO_3$ include hydrothermal synthesis, hydrolysis, and wet synthesis such as a sol-gel method.

The additional components, i.e., the oxides of each Mn, Cu, Si and Mg, and RO (wherein RO represents at least one rare-earth element oxide selected from $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$) are not limited to powdery oxides, as long as the dielectric ceramic material according to the present invention can be produced. A solution of an alkoxide, an organometallic compound, or a carbonate may be used. There is no deterioration of the characteristics obtained by using these materials.

Such material powders are fired to produce the dielectric ceramic materials (1) and (2).

The dielectric ceramic material (1) needs to have an average grain size of 0.3 to 0.7 μm. The dielectric ceramic material (2) needs to have an average grain size of 0.35 to 0.65 μm. When the dielectric ceramic material of the present invention is used in a multilayer ceramic capacitor including layers each having a thickness of about 1 μm, the particle size of the material powder is preferably adjusted to about 0.1 to about 0.2 μm, since the particles grow during firing so as to have a predetermined grain size of the ceramic material.

To appropriately control the increase in grain size in such a manner that an intended grain size of the ceramic material is achieved, firing conditions, such as a firing temperature and a firing time, may be controlled. In dielectric ceramic materials (1) and (2) of the present invention, in particular, the presence of CuO accelerates the increase in grain size. The presence of MgO suppresses the increase in grain size.

Thus, the incorporation of 0.05 to 5 mol of CuO and 0.05 to 3.0 mol of MgO relative to 100 mol of $(Ba_{1-x}Ca_x)_mTiO_3$ results in the dielectric ceramic materials (1) and (2) each having a stable grain size, thereby stabilizing electrical properties.

Therefore, the dielectric constant and insulation resistance are stabilized even when temperature maldistribution occurs during firing, thus suppressing the occurrence of the non-uniformity in quality. Furthermore, many multilayer ceramic capacitors can be produced at a time, thus reducing the production costs.

The use of dielectric ceramic materials (1) and (2) can provides a high-reliability multilayer ceramic capacitor including dielectric ceramic layers even having a small thickness of about 1 μm.

The use of dielectric ceramic material (1) results in a high-reliability multilayer ceramic capacitor having a high relative dielectric constant $\epsilon_r$ of 5000 or more, a low dielectric loss (tan δ) of 10.0% or less, temperature characteristics of the dielectric constant satisfying X6S characteristics (the rate of capacitance change with reference to a capacitance at 25° C. is in the range of ±22% at temperatures between −25° C. and +105° C.), a high resistivity ρ of $10^{10.5}$ Ωm or more, and a mean time to failure of 100 hours or more in an accelerated reliability test (150° C., DC field strength: 6 V/μm), even at a small thickness of a dielectric ceramic layer of about 1 μm. Hence, even a reduction in the thickness of the dielectric ceramic layer to about 1 μm does not require reducing the rated voltage, thus leading to a multilayer ceramic capacitor that achieves further miniaturization and higher capacitance. Furthermore, many stable multilayer ceramic capacitors having satisfactory quality can be produced at a time even when temperature distribution occurs during firing, thus reducing the production costs.

The use of dielectric ceramic material (2) results in a high-reliability dielectric ceramic material and a high-reliability multilayer ceramic capacitor having a high relative dielectric constant $\epsilon_r$ of 6000 or more, a low dielectric loss (tan δ) of 10.0% or less, temperature characteristics of the dielectric constant satisfying X5R characteristics (the rate of capacitance change with reference to a capacitance at 25° C. is in the range of ±15% at temperatures between −25° C. and +85° C.), a high resistivity ρ of $10^{10.5}$ Ωm or more, and a mean time to failure of 100 hours or more in an accelerated reliability test (125° C., DC field strength: 8 V/μm). Hence, even a reduction in the thickness of the dielectric ceramic layer to about 1 μm does not require reducing the rated voltage in the same way as in the case of dielectric ceramic material (1), thus leading to a multilayer ceramic capacitor that achieves further miniaturization and higher capacitance. Furthermore, many stable multilayer ceramic capacitors having satisfactory quality can be produced at low cost.

The multilayer ceramic capacitor according to this embodiment may be fired in a reducing atmosphere; hence, the internal electrodes may be each composed of a base metal, such as nickel, a nickel alloy, copper, or a copper alloy.

EXAMPLES

The present invention will be described below on the basis of specific examples.

Example 1

In this example, after the preparation of material powders of dielectric ceramic material (1), multilayer ceramic capacitors were produced with the material powders. First, high-purity $TiO_2$, $BaCO_3$ and $CaCO_3$, which were starting materials, were prepared. These starting materials were weighed in a manner such that the Ti, Ba and Ca were contained in amounts represented by samples A to N shown in Table 1, wet-mixed, pulverized, and dried to prepare mixed powders. The mixed powders were heated at 950° C. or more for 2 hours to prepare $(Ba,Ca)TiO_3$ powders represented by samples A to N having compositions and average grain sizes Ra shown in Table 1, the material powders each having an average particle size of 0.1 to 0.2 µm. A MgO powder, a CuO powder, a $MnCO_3$ powder, a $SiO_2$ powder and an RO powder (wherein RO represents at least one rare-earth element oxide selected from $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2C_3$ and $Lu_2O_3$) were prepared as other material powders. In Table 1, samples A to D marked with asterisks "*" indicate that x and m were outside the range of the present invention.

Subsequently, the powders were weighed in a manner such that compositions shown in Tables 2 and 3 were achieved, and then mixed to obtain mixtures represented by sample Nos. 1 to 95. A polyvinyl butyral binder and an organic solvent such as ethanol were added to each mixture, and the resulting mixtures were wet-mixed with ball mills to prepare ceramic slurries. Each of the resulting ceramic slurries was formed into a sheet by a doctor blade method to obtain a rectangular ceramic green sheet having a thickness of 1.4 µm. Next, a conductive paste principally composed of nickel (Ni) was applied onto each of the resulting ceramic green sheets by printing to provide a conductive paste film to be converted into an internal electrode. One end of the conductive paste film is disposed at a first end of the ceramic green sheet, and the other end of the conductive paste film was disposed away from a second end of the ceramic green sheet. In Table 2, asterisk-marked sample Nos. 1 to 19 were samples in which any one of x, m, a, b, c, d and e was outside the range of the present invention.

Next, a plurality of the ceramic green sheets that were the same type were stacked in a manner such that the first end, in which the conductive paste films were disposed, and the second end were alternately disposed. The resulting stack was interposed between ceramic green sheets each having no conducting paste film and then was subjected to press bonding to obtain a laminate. Each of the resulting laminates was heated to 350° C. in an $N_2$ atmosphere to decompose the binder and then fired for 2 hours in a reducing atmosphere containing a $H_2$ gas, a $N_2$ gas, and a $H_2O$ gas and having an oxygen partial pressure of $10^{-9}$ to $10^{-12}$ MPa at the temperature shown in Tables 2 and 3.

A silver paste containing a $B_2O_3$—$SiO_2$—BaO-based glass frit was applied to both ends of each of the fired laminates and then baked at 600° C. in an $N_2$ atmosphere to form external electrodes electrically connected to the internal electrodes. Thereby, laminated ceramic capacitors including the dielectric ceramic material (1) of the present invention were produced.

The outer dimensions of each of the resulting multilayer ceramic capacitors (sample Nos. 1 to 95) were 5.0 mm in width, 5.7 mm in length, and 2.4 mm in thickness. The dielectric ceramic layers disposed between the internal electrodes each had a thickness of 1.0 µm. The number of effective dielectric ceramic layers was five layers. The area of each of the opposite electrodes was $16.3 \times 10^{-6}$ $m^2$ per layer.

Next, the electrical properties of the multilayer ceramic capacitors of sample Nos. 1 to 95 were measured. Capacitance C and dielectric loss (tan δ) were measured with an automatic bridge measurement according to JIS 5102. Dielectric constant $\epsilon_r$ was calculated from the resulting capacitance C. Tables 4 and 5 show the results.

To measure insulation resistance R, an insulation resistance tester was used. That is, 4 V DC was applied for 1 minute, and the insulation resistance R was measured at +25° C., and then the resistivity ρ was calculated. Tables 4 and 5 show the results as log ρ.

With respect to the rate of change of capacitance C with temperature, the rate of change $\Delta C/C_{25°\,C.}$ in the range of −25° C. to +105° C. with reference to a capacitance C at 25° C. was determined. Tables 4 and 5 show the results as the rate of change of the dielectric constant with temperature.

With respect to a high-temperature load test, 6 V DC was applied to 12 specimens of each sample at 150° C., and the change in insulation resistance R with time was measured. In the high temperature load test, a state in which the insulation resistance R of each sample reached $10^5 \Omega$ or less was defined as failure. After the measurement of the time required for reaching failure, the meantime to failure was determined. Tables 4 and 5 show the results.

With respect to the average grain size, after the break of each fired sample, the resulting samples were exposed for 5 minutes to the same oxygen partial pressure as that during firing at a temperature 100° C. lower than the firing temperature. Electron micrographs of the resulting samples were taken. Then, the size of 200 grains of the ceramic material were measured per sample. The mean value thereof was defined as an average grain size.

TABLE 1

| Sample | x | m | Particle size of material |
|---|---|---|---|
| *A | 0.037 | 1.005 | 0.12 |
| *B | 0.160 | 1.005 | 0.13 |
| *C | 0.080 | 0.995 | 0.12 |
| *D | 0.100 | 1.032 | 0.14 |
| E | 0.050 | 1.002 | 0.15 |
| F | 0.040 | 1.002 | 0.11 |
| G | 0.058 | 1.011 | 0.16 |
| H | 0.070 | 1.004 | 0.13 |
| I | 0.100 | 1.007 | 0.12 |
| J | 0.125 | 1.020 | 0.14 |
| K | 0.150 | 1.005 | 0.11 |
| L | 0.050 | 0.998 | 0.13 |
| M | 0.050 | 1.015 | 0.12 |
| N | 0.050 | 1.030 | 0.12 |

TABLE 2

| Sample | Rare-earth element | Powder used | x | m | a | b | c | d | e | Ra | Firing temperature [° C.] |
|---|---|---|---|---|---|---|---|---|---|---|---|
| *No. 1 | Sm | A | 0.037 | 1.005 | 0.150 | 0.60 | 2.40 | 0.80 | 0.40 | 0.38 | 1200 |
| *No. 2 | Sm | B | 0.160 | 1.005 | 0.150 | 0.60 | 2.40 | 0.80 | 0.40 | 0.38 | 1200 |
| *No 3 | Sm | C | 0.080 | 0.995 | 0.150 | 0.60 | 2.40 | 0.80 | 0.40 | 0.41 | 1200 |
| *No. 4 | Sm | D | 0.100 | 1.032 | 0.150 | 0.60 | 2.40 | 0.80 | 0.40 | 0.47 | 1200 |
| *No. 5 | Sm | E | 0.050 | 1.002 | 0.007 | 0.60 | 2.40 | 0.80 | 0.40 | 0.38 | 1200 |
| *No. 6 | Sm | E | 0.050 | 1.002 | 5.200 | 0.60 | 2.40 | 0.80 | 0.40 | 0.70 | 1200 |
| *No. 7 | Sm | E | 0.050 | 1.002 | 0.150 | 0.04 | 2.40 | 0.80 | 0.40 | 0.25 | 1150 |
| *No. 8 | Sm | E | 0.050 | 1.002 | 0.150 | 5.10 | 2.40 | 0.80 | 0.40 | 0.89 | 1300 |
| *No. 9 | Sm | E | 0.050 | 1.002 | 0.150 | 0.60 | 0.15 | 0.80 | 0.40 | 0.58 | 1200 |
| *No. 10 | Sm | E | 0.050 | 1.002 | 0.150 | 0.60 | 8.10 | 0.80 | 0.40 | 0.53 | 1200 |
| *No. 11 | Sm | E | 0.050 | 1.002 | 0.150 | 0.60 | 2.40 | 0.00 | 0.40 | 0.75 | 1170 |
| *No. 12 | Sm | E | 0.050 | 1.002 | 0.150 | 0.60 | 2.40 | 0.00 | 0.40 | 0.88 | 1200 |
| *No. 13 | Sm | E | 0.050 | 1.002 | 0.150 | 0.60 | 2.40 | 0.00 | 0.40 | 1.04 | 1230 |
| *No. 14 | Sm | E | 0.050 | 1.002 | 0.150 | 0.60 | 2.40 | 0.04 | 0.40 | 0.73 | 1170 |
| *No. 15 | Sm | E | 0.050 | 1.002 | 0.150 | 0.60 | 2.40 | 0.04 | 0.40 | 0.89 | 1200 |
| *No. 16 | Sm | E | 0.050 | 1.002 | 0.150 | 0.60 | 2.40 | 0.04 | 0.40 | 1.04 | 1230 |
| *No. 17 | Sm | E | 0.050 | 1.002 | 0.150 | 0.60 | 2.40 | 3.20 | 0.40 | 0.26 | 1200 |
| *No. 18 | Sm | E | 0.050 | 1.002 | 0.150 | 0.60 | 2.40 | 0.80 | 0.04 | 0.48 | 1200 |
| *No. 19 | Sm | E | 0.050 | 1.002 | 0.150 | 0.60 | 2.40 | 0.80 | 2.70 | 0.49 | 1200 |
| No. 20 | Sm | F | 0.040 | 1.002 | 0.150 | 0.60 | 2.40 | 0.80 | 0.40 | 0.44 | 1200 |
| No. 21 | Sm | G | 0.058 | 1.011 | 0.150 | 0.60 | 2.40 | 0.80 | 0.40 | 0.56 | 1200 |
| No. 22 | Sm | H | 0.070 | 1.004 | 0.150 | 0.60 | 2.40 | 0.80 | 0.40 | 0.45 | 1200 |
| No. 23 | Sm | I | 0.100 | 1.007 | 0.150 | 0.60 | 2.40 | 0.80 | 0.40 | 0.55 | 1200 |
| No. 24 | Sm | K | 0.125 | 1.020 | 0.150 | 0.60 | 2.40 | 0.80 | 0.40 | 0.47 | 1200 |
| No. 25 | Sm | L | 0.150 | 1.005 | 0.150 | 0.60 | 2.40 | 0.80 | 0.40 | 0.33 | 1200 |
| No. 26 | Sm | L | 0.050 | 0.998 | 0.150 | 0.60 | 2.40 | 0.80 | 0.40 | 0.56 | 1200 |
| No. 27 | Sm | M | 0.050 | 1.015 | 0.150 | 0.60 | 2.40 | 0.80 | 0.40 | 0.47 | 1200 |
| No. 28 | Sm | N | 0.050 | 1.030 | 0.150 | 0.60 | 2.40 | 0.80 | 0.40 | 0.43 | 1200 |
| No. 29 | Sm | E | 0.050 | 1.002 | 0.010 | 0.60 | 2.40 | 0.80 | 0.40 | 0.61 | 1200 |
| No. 30 | Sm | E | 0.050 | 1.002 | 0.100 | 0.60 | 2.40 | 0.80 | 0.40 | 0.55 | 1200 |
| No. 31 | Sm | E | 0.050 | 1.002 | 0.400 | 0.60 | 2.40 | 0.80 | 0.40 | 0.55 | 1200 |
| No. 32 | Sm | E | 0.050 | 1.002 | 0.700 | 0.60 | 2.40 | 0.80 | 0.40 | 0.58 | 1200 |
| No. 33 | Sm | E | 0.050 | 1.002 | 1.000 | 0.60 | 2.40 | 0.80 | 0.40 | 0.51 | 1175 |
| No. 34 | Sm | E | 0.050 | 1.002 | 2.000 | 0.60 | 2.40 | 0.80 | 0.40 | 0.41 | 1175 |
| No. 35 | Sm | E | 0.050 | 1.002 | 3.500 | 0.60 | 2.40 | 0.80 | 0.40 | 0.40 | 1150 |
| No. 36 | Sm | E | 0.050 | 1.002 | 5.000 | 0.60 | 2.40 | 0.80 | 0.40 | 0.39 | 1150 |
| No. 37 | Sm | E | 0.050 | 1.002 | 0.150 | 0.05 | 2.40 | 0.80 | 0.40 | 0.45 | 1200 |
| No. 38 | Sm | E | 0.050 | 1.002 | 0.150 | 0.15 | 2.40 | 0.80 | 0.40 | 0.42 | 1200 |
| No. 39 | Sm | E | 0.050 | 1.002 | 0.150 | 0.90 | 2.40 | 0.80 | 0.40 | 0.52 | 1200 |
| No. 40 | Sm | E | 0.050 | 1.002 | 0.150 | 1.20 | 2.40 | 0.80 | 0.40 | 0.52 | 1200 |
| No. 41 | Sm | E | 0.050 | 1.002 | 0.150 | 3.00 | 2.40 | 0.80 | 0.40 | 0.42 | 1200 |
| No. 42 | Sm | E | 0.050 | 1.002 | 0.150 | 5.00 | 2.40 | 0.80 | 0.40 | 0.54 | 1200 |
| No. 43 | Sm | E | 0.050 | 1.002 | 0.150 | 0.60 | 0.20 | 0.80 | 0.40 | 0.54 | 1225 |
| No. 44 | Sm | E | 0.050 | 1.002 | 0.150 | 0.60 | 0.60 | 0.80 | 0.40 | 0.42 | 1225 |
| No. 45 | Sm | E | 0.050 | 1.002 | 0.150 | 0.60 | 1.00 | 0.80 | 0.40 | 0.56 | 1200 |
| No. 46 | Sm | E | 0.050 | 1.002 | 0.150 | 0.60 | 4.50 | 0.80 | 0.40 | 0.41 | 1200 |
| No. 47 | Sm | E | 0.050 | 1.002 | 0.150 | 0.60 | 6.50 | 0.80 | 0.40 | 0.53 | 1150 |
| No. 48 | Sm | E | 0.050 | 1.002 | 0.150 | 0.60 | 8.00 | 0.80 | 0.40 | 0.59 | 1150 |
| No. 49 | Sm | E | 0.050 | 1.002 | 0.150 | 0.60 | 2.40 | 0.05 | 0.40 | 0.62 | 1200 |
| No. 50 | Sm | E | 0.050 | 1.002 | 0.150 | 0.60 | 2.40 | 0.15 | 0.40 | 0.38 | 1170 |

TABLE 3

| Sample | Rare-earth element | Powder used | x | m | a | b | c | d | e | Ra | Firing temperature [° C.] |
|---|---|---|---|---|---|---|---|---|---|---|---|
| No. 51 | Sm | E | 0.050 | 1.002 | 0.150 | 0.60 | 2.40 | 0.15 | 0.40 | 0.46 | 1200 |
| No. 52 | Sm | E | 0.050 | 1.002 | 0.150 | 0.60 | 2.40 | 0.15 | 0.40 | 0.54 | 1230 |
| No. 53 | Sm | E | 0.050 | 1.002 | 0.150 | 0.60 | 2.40 | 0.40 | 0.40 | 0.48 | 1180 |
| No. 54 | Sm | E | 0.050 | 1.002 | 0.150 | 0.60 | 2.40 | 1.00 | 0.40 | 0.43 | 1170 |
| No. 55 | Sm | E | 0.050 | 1.002 | 0.150 | 0.60 | 2.40 | 1.00 | 0.40 | 0.56 | 1200 |
| No. 56 | Sm | E | 0.050 | 1.002 | 0.150 | 0.60 | 2.40 | 1.00 | 0.40 | 0.62 | 1230 |
| No. 57 | Sm | E | 0.050 | 1.002 | 0.150 | 0.60 | 2.40 | 1.70 | 0.40 | 0.52 | 1200 |
| No. 58 | Sm | E | 0.050 | 1.002 | 0.150 | 0.60 | 2.40 | 2.60 | 0.40 | 0.43 | 1200 |
| No. 59 | Sm | E | 0.050 | 1.002 | 0.150 | 0.60 | 2.40 | 3.00 | 0.40 | 0.47 | 1150 |
| No. 60 | Sm | E | 0.050 | 1.002 | 0.150 | 0.60 | 2.40 | 0.80 | 0.05 | 0.45 | 1200 |
| No. 61 | Sm | E | 0.050 | 1.002 | 0.150 | 0.60 | 2.40 | 0.80 | 0.20 | 0.30 | 1200 |
| No. 62 | Sm | E | 0.050 | 1.002 | 0.150 | 0.60 | 2.40 | 0.80 | 0.90 | 0.38 | 1200 |
| No. 63 | Sm | E | 0.050 | 1.002 | 0.150 | 0.60 | 2.40 | 0.80 | 1.20 | 0.46 | 1200 |
| No. 64 | Sm | E | 0.050 | 1.002 | 0.150 | 0.60 | 2.40 | 0.80 | 1.80 | 0.49 | 1200 |
| No. 65 | Sm | E | 0.050 | 1.002 | 0.150 | 0.60 | 2.40 | 0.80 | 2.50 | 0.57 | 1200 |

TABLE 3-continued

| Sample | Rare-earth element | Powder used | x | m | a | b | c | d | e | Ra | Firing temperature [° C.] |
|---|---|---|---|---|---|---|---|---|---|---|---|
| No. 66 | Y | E | 0.050 | 1.002 | 0.150 | 0.60 | 2.40 | 0.80 | 0.40 | 0.56 | 1200 |
| No. 67 | Y | E | 0.050 | 1.002 | 0.150 | 0.60 | 2.40 | 0.80 | 1.50 | 0.38 | 1200 |
| No. 68 | La | E | 0.050 | 1.002 | 0.150 | 0.60 | 2.40 | 0.80 | 0.40 | 0.40 | 1200 |
| No. 69 | La | E | 0.050 | 1.002 | 0.150 | 0.60 | 2.40 | 0.80 | 1.50 | 0.66 | 1200 |
| No. 70 | Ce | E | 0.050 | 1.002 | 0.150 | 0.60 | 2.40 | 0.80 | 0.40 | 0.59 | 1200 |
| No. 71 | Ce | E | 0.050 | 1.002 | 0.150 | 0.60 | 2.40 | 0.80 | 1.50 | 0.40 | 1200 |
| No. 72 | Nd | E | 0.050 | 1.002 | 0.150 | 0.60 | 2.40 | 0.80 | 0.40 | 0.59 | 1200 |
| No. 73 | Nd | E | 0.050 | 1.002 | 0.150 | 0.60 | 2.40 | 0.80 | 1.50 | 0.46 | 1225 |
| No. 74 | Eu | E | 0.050 | 1.002 | 0.150 | 0.60 | 2.40 | 0.80 | 0.40 | 0.47 | 1200 |
| No. 75 | Eu | E | 0.050 | 1.002 | 0.150 | 0.60 | 2.40 | 0.80 | 1.50 | 0.48 | 1200 |
| No. 76 | Gd | E | 0.050 | 1.002 | 0.150 | 0.60 | 2.40 | 0.80 | 0.40 | 0.50 | 1200 |
| No. 77 | Gd | E | 0.050 | 1.002 | 0.150 | 0.60 | 2.40 | 0.80 | 1.50 | 0.65 | 1200 |
| No. 78 | Tb | E | 0.050 | 1.002 | 0.150 | 0.60 | 2.40 | 0.80 | 0.40 | 0.34 | 1200 |
| No. 79 | Tb | E | 0.050 | 1.002 | 0.150 | 0.60 | 2.40 | 0.80 | 1.50 | 0.41 | 1200 |
| No. 80 | Dy | E | 0.050 | 1.002 | 0.150 | 0.60 | 2.40 | 0.80 | 0.40 | 0.42 | 1200 |
| No. 81 | Dy | E | 0.050 | 1.002 | 0.150 | 0.60 | 2.40 | 0.80 | 1.50 | 0.47 | 1200 |
| No. 82 | Ho | E | 0.050 | 1.002 | 0.150 | 0.60 | 2.40 | 0.80 | 0.40 | 0.36 | 1200 |
| No. 83 | Ho | E | 0.050 | 1.002 | 0.150 | 0.60 | 2.40 | 0.80 | 1.50 | 0.55 | 1200 |
| No. 84 | Er | E | 0.050 | 1.002 | 0.150 | 0.60 | 2.40 | 0.80 | 0.40 | 0.47 | 1200 |
| No. 85 | Er | E | 0.050 | 1.002 | 0.150 | 0.60 | 2.40 | 0.80 | 1.50 | 0.50 | 1200 |
| No. 86 | Tm | E | 0.050 | 1.002 | 0.150 | 0.60 | 2.40 | 0.80 | 0.40 | 0.43 | 1200 |
| No. 87 | Tm | E | 0.050 | 1.002 | 0.150 | 0.60 | 2.40 | 0.80 | 1.50 | 0.49 | 1200 |
| No. 88 | Yb | E | 0.050 | 1.002 | 0.150 | 0.60 | 2.40 | 0.80 | 0.40 | 0.51 | 1200 |
| No. 89 | Yb | E | 0.050 | 1.002 | 0.150 | 0.60 | 2.40 | 0.80 | 1.50 | 0.37 | 1200 |
| No. 90 | Lu | E | 0.050 | 1.002 | 0.150 | 0.60 | 2.40 | 0.80 | 0.40 | 0.38 | 1200 |
| No. 91 | Lu | E | 0.050 | 1.002 | 0.150 | 0.60 | 2.40 | 0.80 | 1.50 | 0.39 | 1200 |
| No. 92 | Sm + Dy (0.3 each) | E | 0.050 | 1.002 | 0.150 | 0.60 | 2.40 | 0.80 | 0.60 | 0.59 | 1200 |
| No. 93 | Sm + Dy (0.7 each) | E | 0.050 | 1.002 | 0.150 | 0.60 | 2.40 | 0.80 | 1.40 | 0.52 | 1200 |
| No. 94 | Gd + Yb (0.3 each) | E | 0.050 | 1.002 | 0.150 | 0.60 | 2.40 | 0.80 | 0.60 | 0.54 | 1200 |
| No. 95 | Gd + Yb (0.7 each) | E | 0.050 | 1.002 | 0.150 | 0.60 | 2.40 | 0.80 | 1.40 | 0.46 | 1200 |

TABLE 4

| Sample | Relative dielectric constant $\epsilon_r$ | tan δ [%] | Rate of change of dielectric constant with temperature [%] | Resistivity Log ρ ρ: Ωm | Mean time to failure [hour] |
|---|---|---|---|---|---|
| *No. 1 | 5270 | 8.1 | −22.5 | 10.9 | 10 |
| *No. 2 | 4520 | 7.9 | −23.2 | 11.0 | 30 |
| *No 3 | 5380 | 7.7 | −22.1 | 9.2 | Unmeasurable |
| *No. 4 | 4820 | 10.5 | −23.5 | 7.9 | Unmeasurable |
| *No. 5 | 5290 | 7.9 | −21.3 | 8.5 | Unmeasurable |
| *No. 6 | 5940 | 10.7 | −22.5 | 9.2 | 30 |
| *No. 7 | 4870 | 7.2 | −21.0 | 11.0 | 5 |
| *No. 8 | 7450 | 13.2 | −29.2 | 10.7 | 140 |
| *No. 9 | 4120 | 13.2 | −24.2 | 9.3 | 25 |
| *No. 10 | 5650 | 8.7 | −23.2 | 10.7 | 20 |
| *No. 11 | 6210 | 11.4 | −23.5 | 11.0 | 140 |
| *No. 12 | 6810 | 12.1 | −23.7 | 11.1 | 130 |
| *No. 13 | 7540 | 13.5 | −24.3 | 11.3 | 140 |
| *No. 14 | 6350 | 11.2 | −24.2 | 11.1 | 120 |
| *No. 15 | 6940 | 12.2 | −24.1 | 11.1 | 150 |
| *No. 16 | 7520 | 13.3 | −24.1 | 11.1 | 120 |
| *No. 17 | 4630 | 6.6 | −20.1 | 11.1 | 120 |
| *No. 18 | 5200 | 8.2 | −20.4 | 11.1 | Unmeasurable |
| *No. 19 | 5500 | 8.1 | −24.3 | 11.2 | 190 |
| No. 20 | 5420 | 7.9 | −20.0 | 11.3 | 170 |
| No. 21 | 5560 | 8.7 | −21.0 | 10.7 | 170 |
| No. 22 | 5360 | 8.4 | −20.7 | 11.1 | 130 |
| No. 23 | 5690 | 8.7 | −21.1 | 10.7 | 160 |
| No. 24 | 5480 | 8.6 | −20.5 | 10.7 | 150 |
| No. 25 | 5220 | 7.3 | −19.6 | 11.3 | 160 |
| No. 26 | 5650 | 8.7 | −20.8 | 10.8 | 160 |
| No. 27 | 5440 | 8.6 | −19.7 | 10.9 | 150 |
| No. 28 | 5360 | 8.3 | −19.8 | 10.8 | 105 |
| No. 29 | 5650 | 8.9 | −20.5 | 10.9 | 140 |
| No. 30 | 5690 | 8.7 | −20.4 | 11.2 | 130 |
| No. 31 | 5560 | 9.0 | −20.3 | 10.6 | 160 |
| No. 32 | 5690 | 9.0 | −21.4 | 10.8 | 170 |
| No. 33 | 5610 | 8.5 | −20.4 | 11.0 | 170 |
| No. 34 | 5280 | 8.3 | −20.5 | 10.6 | 170 |
| No. 35 | 5260 | 7.8 | −20.3 | 10.9 | 120 |
| No. 36 | 5280 | 8.1 | −19.4 | 11.1 | 170 |
| No. 37 | 5470 | 8.0 | −20.3 | 11.4 | 150 |
| No. 38 | 5410 | 7.7 | −19.6 | 10.8 | 150 |
| No. 39 | 5630 | 8.4 | −20.5 | 11.3 | 160 |
| No. 40 | 5530 | 8.8 | −20.8 | 11.4 | 160 |
| No. 41 | 5310 | 7.7 | −20.8 | 10.7 | 150 |
| No. 42 | 5680 | 8.8 | −20.8 | 11.0 | 120 |
| No. 43 | 5660 | 8.4 | −20.9 | 11.3 | 130 |
| No. 44 | 5330 | 7.8 | −19.6 | 11.0 | 150 |
| No. 45 | 5530 | 8.4 | −21.2 | 10.9 | 180 |
| No. 46 | 5270 | 8.2 | −19.9 | 11.3 | 150 |
| No. 47 | 5530 | 8.5 | −20.2 | 11.0 | 130 |
| No. 48 | 5750 | 8.8 | −20.9 | 10.6 | 180 |
| No. 49 | 5720 | 8.8 | −20.9 | 11.0 | 110 |
| No. 50 | 5240 | 9.0 | −20.2 | 10.7 | 170 |

TABLE 5

| Sample | Relative dielectric constant $\epsilon_r$ | tan δ [%] | Rate of change of dielectric constant with temperature [%] | Resistivity Log ρ ρ: Ωm | Mean time to failure [hour] |
|---|---|---|---|---|---|
| No. 51 | 5490 | 8.7 | −20.5 | 10.9 | 160 |
| No. 52 | 5720 | 8.7 | −20.0 | 11.0 | 170 |
| No. 53 | 5410 | 8.2 | −20.0 | 11.0 | 120 |
| No. 54 | 5440 | 8.3 | −20.1 | 11.1 | 180 |
| No. 55 | 5680 | 8.2 | −20.5 | 11.0 | 140 |
| No. 56 | 5900 | 8.6 | −19.9 | 10.8 | 170 |
| No. 57 | 5470 | 8.3 | −20.3 | 10.7 | 180 |
| No. 58 | 5430 | 8.3 | −20.6 | 10.7 | 140 |
| No. 59 | 5460 | 8.6 | −20.2 | 11.2 | 140 |
| No. 60 | 5490 | 8.3 | −20.8 | 11.4 | 120 |
| No. 61 | 5200 | 7.6 | −20.1 | 11.1 | 110 |
| No. 62 | 5170 | 7.8 | −19.6 | 11.0 | 140 |
| No. 63 | 5450 | 8.2 | −20.6 | 11.2 | 110 |
| No. 64 | 5440 | 8.5 | −20.4 | 10.7 | 140 |
| No. 65 | 5630 | 8.5 | −20.5 | 10.9 | 170 |
| No. 66 | 5670 | 8.6 | −20.3 | 11.0 | 150 |
| No. 67 | 5190 | 7.8 | −19.6 | 11.1 | 180 |
| No. 68 | 5400 | 7.9 | −20.0 | 10.7 | 160 |
| No. 69 | 5850 | 9.6 | −21.4 | 11.3 | 150 |
| No. 70 | 5720 | 9.0 | −20.3 | 10.8 | 160 |
| No. 71 | 5340 | 8.0 | −20.3 | 10.8 | 120 |
| No. 72 | 5750 | 8.8 | −21.0 | 11.3 | 120 |
| No. 73 | 5330 | 8.0 | −19.7 | 10.7 | 110 |
| No. 74 | 5520 | 8.1 | −19.8 | 11.2 | 160 |
| No. 75 | 5500 | 8.3 | −20.0 | 11.0 | 160 |
| No. 76 | 5440 | 8.7 | −20.4 | 10.8 | 120 |
| No. 77 | 5740 | 9.1 | −21.7 | 10.6 | 170 |
| No. 78 | 5190 | 7.7 | −19.8 | 10.8 | 150 |
| No. 79 | 5370 | 7.6 | −19.5 | 10.9 | 170 |
| No. 80 | 5340 | 7.9 | −20.1 | 11.0 | 180 |
| No. 81 | 5450 | 8.4 | −20.1 | 10.8 | 150 |
| No. 82 | 5160 | 7.8 | −20.2 | 11.2 | 130 |
| No. 83 | 5610 | 9.0 | −20.7 | 10.9 | 110 |
| No. 84 | 5500 | 8.3 | −20.2 | 11.1 | 130 |
| No. 85 | 5530 | 8.5 | −20.0 | 10.7 | 110 |
| No. 86 | 5330 | 7.9 | −19.8 | 10.9 | 160 |
| No. 87 | 5450 | 8.5 | −20.6 | 10.8 | 140 |
| No. 88 | 5620 | 8.5 | −21.1 | 11.4 | 130 |
| No. 89 | 5340 | 7.7 | −20.2 | 11.0 | 180 |
| No. 90 | 5350 | 7.7 | −20.0 | 10.9 | 120 |
| No. 91 | 5200 | 7.6 | −20.3 | 11.4 | 110 |
| No. 92 | 5750 | 9.1 | −20.8 | 11.0 | 140 |
| No. 93 | 5570 | 8.9 | −20.9 | 11.3 | 160 |
| No. 94 | 5670 | 8.6 | −20.1 | 11.4 | 110 |
| No. 95 | 5390 | 8.0 | −20.1 | 11.2 | 140 |

As is clear from the measurement results shown in Tables 4 and 5, all of the multilayer ceramic capacitors sample Nos. 20 to 95, each including dielectric ceramic material (1) having a composition within the range of the present invention was found to be a high-reliability multilayer ceramic capacitor having a mean time to failure of 100 hours or more in the high-temperature load test, a high dielectric constant $\epsilon_r$ of 5000 or more, a small dielectric loss (tan δ) of 10% or less, a rate of change of the dielectric constant with temperature meeting the X6S characteristics (within ±22%), and a high resistivity ρ of $10^{10.5}$ Ωm (log ρ=10.5) or more, in spite of the fact that the thickness of the dielectric ceramic layer was reduced to about 1 μm.

It was found that in the case where the molar ratio d of MgO was in the range of 0.05≦d≦3.0 relative to 100 of (Ba,Ca)TiO$_3$, even when each of sample Nos. 54 to 56 having the same composition was fired at a firing temperature range between 1170° C. and 1230° C., a difference in temperature of 60° C., the change in relative dielectric constant $\epsilon_r$ was small to achieve stable quality without the nonuniformity in electrical properties.

Furthermore, as is clear from the case of sample Nos. 66 to 69, in the case where the molar amount e, which was the total of the molar amounts of two rare-earth element oxides, was in the range of 0.05≦e≦2.5 relative to 100 of (Ba,Ca)TiO$_3$, it was possible to obtain the multilayer ceramic capacitors having satisfactory electrical properties in the same way as in other sample Nos. 20 to 91 each containing a single type of rare-earth element oxide, even when the dielectric ceramic layers each have a small thickness of about 1 μm.

In contrast, as is clear from the measurement results of sample Nos. 1 to 19 shown in Table 4, it was found that if any one of the content of the oxides was outside the range of the present invention, the resulting multilayer ceramic capacitors had degraded electrical properties even if each of the contents of the other oxides was within the range of the present invention, as described below.

In the case of sample No. 1 using sample A in which Ba ions in $(Ba_{1-x}Ca_x)_m TiO_3$ were partially replaced with Ca ions and the substitution rate x of Ca ions was less than 0.04, the mean time to failure in the high-temperature load test was as short as 10 hours. In the case of sample No. 2 using sample B in which the substitution rate x exceeded 0.15, the relative dielectric constant $\epsilon_r$ was 4520, which was less than 5000, the rate of change of the dielectric constant with temperature was −23.2%, which was outside the range of ±22%, and mean time to failure was as short as 30 hours.

In the case of sample No. 3 using sample C in which the ratio m, i.e., $Ba_{1-x}Ca_x/Ti$, was less than 0.998, the resistivity ρ was $10^{9.2}$ Ωm, which was less than $10^{10.5}$ Ωm. The mean time to failure was too short to be measured. In the case of sample No. 4 using sample D in which the ratio m exceeded 1.030, the relative dielectric constant $\epsilon_r$ was 4820, which was less than 5000. The dielectric loss (tan δ) was 10.5%, which exceeded 10%. The resistivity ρ was $10^{7.9}$ Ωm, which was less than $10^{10.5}$ Ωm. The mean time to failure was too short to be measured.

In the case of sample No. 5 in which the molar ratio a of MnO was less than 0.01 relative to 100 of $(Ba_{1-x}Ca_x)_m TiO_3$, the resistivity ρ was $10^{8.5}$ Ωm, which was less than $10^{10.5}$ Ωm. The mean time to failure was too short to be measured. In the case of sample No. 6 in which the molar ratio a exceeded 5, the rate of change of the dielectric constant with temperature was −22.5%, which was outside of the range of ±22%. The resistivity ρ was $10^{9.2}$ Ωm, which was less than $10^{10.5}$ Ωm. The mean time to failure was as short as 30 hours.

In the case of sample No. 7 in which the molar ratio b of CuO was less than 0.05, the relative dielectric constant $\epsilon_r$ was 4870, which was less than 5000. The mean time to failure was as short as 5 hours. Furthermore, MnO particles each having a size of 1 μm or more are segregated to degrade the uniformity in MnO distribution. In the case of sample No. 8 in which the molar ratio b exceeded 5, the rate of change of the dielectric constant with temperature was −29.2%, which was outside the range of ±22%.

In the case of sample No. 9 in which the molar ratio c of SiO$_2$ was less than 0.2, the relative dielectric constant $\epsilon_r$ was 4120, which was less than 5000. The dielectric loss (tan δ) was 13.2%, which exceeded 10%. The rate of change of the dielectric constant with temperature was −24.2%, which was outside the range of ±22%. The resistivity ρ was $10^{9.3}$ Ωm, which was less than $10^{10.5}$ Ωm. The mean time to failure was as short as 25 hours. In the case of sample No. 10 in which the molar ratio c exceeded 8, the rate of change of the dielectric constant with temperature was −23.2%, which was outside the range of ±22%. The mean time to failure was as short as 20 hours.

In cases of sample Nos. 11 to 16 in which the molar ratios d were each less than 0.05, each average grain size exceeded 0.7 μm (see Table 2). When the firing temperature was changed from 1170° C. to 1230° C., a difference in temperature of 60° C., the change in relative dielectric constant $\epsilon_r$ was 1000 or more to cause the nonuniformity in electrical properties. In the case of sample No. 17 in which the molar ratio d exceeded 3, the grain size was 0.26 μm, which was less than 0.3 μm. The relative dielectric constant $\epsilon_r$ was 4630, which was less than 5000.

In the case of sample No. 18 in which the molar ratio e of RO was less than 0.05, the mean time to failure was too short to be measured. In the case of sample No. 19 in which the molar ratio d exceeded 2.5, the rate of change of the dielectric constant with temperature was −24.3%, which was outside the range of ±22%.

In cases of sample Nos. 7 and 17 in which the average grain sizes were each less than 0.3 μm, each relative dielectric constant $\epsilon_r$ was as small as less than 5000. In cases of sample Nos. 8 and 11 to 16 in which the average grain sizes each exceeded 0.7 μm, each rate of change of the dielectric constant with temperature exceeded ±22%.

Example 2

In this example, after the preparation of material powders of dielectric ceramic material (2), multilayer ceramic capacitors were produced with the material powders. First, high-purity $TiO_2$, $BaCO_3$ and $CaCO_3$, which were starting materials, were prepared. These starting materials were weighed in a manner such that Ti, Ba and Ca were contained in amounts represented by samples A' to K' shown in Table 6, wet-mixed, pulverized, and dried to prepare mixed powders. The mixed powders were heated at 950° C. or more for 2 hours to prepare $BaTiO_3$ or $(Ba,Ca)TiO_3$ powders represented by samples A' to K' having compositions shown in Table 6, the material powders each having an average particle size of 0.1 to 0.2 μm. A MgO powder, a CuO powder, a $MnCO_3$ powder, a $SiO_2$ powder and an RO powder (wherein RO represents at least one rare-earth element oxide selected from $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$) were prepared as other material powders. In Table 6, samples A', B', and C' with asterisks "*" indicate that x and m were outside the range of the present invention.

Subsequently, the powders were weighed in a manner such that compositions shown in Tables 7 and 8 were achieved, and then mixed to obtain mixtures represented by sample Nos. 101 to 192. A polyvinyl butyral binder and an organic solvent such as ethanol were added to each mixture, and the resulting mixtures were wet-mixed with ball mills to prepare ceramic slurries. Each of the resulting ceramic slurries was formed into a sheet by a doctor blade method to obtain a rectangular ceramic green sheet having a thickness of 1.4 μm. Next, a conductive paste principally composed of nickel (Ni) was applied onto each of the resulting ceramic green sheets by printing to provide a conductive paste film to be an internal electrode. One end of the conductive paste film is disposed at a first end of the ceramic green sheet, and the other end of the conductive paste film was disposed away from a second end of the ceramic green sheet. In Table 7, asterisk-marked sample Nos. 101 to 118 were samples in which any one of x, m, a, b, c, d, and e was outside the range of the present invention.

Next, a plurality of the ceramic green sheets that were the same type were stacked in a manner such that the first end, in which the conductive paste films were disposed, and the second end were alternately disposed. The resulting stack was interposed between ceramic green sheets each having no conducting paste film and then was subjected to press bonding to obtain a laminate. Each of the resulting laminates was heated to 350° C. in an $N_2$ atmosphere to decompose the binder and then fired for 2 hours in a reducing atmosphere containing a $H_2$ gas, a $N_2$ gas, and a $H_2O$ gas and having an oxygen partial pressure of $10^{-9}$ to $10^{-12}$ MPa at a temperature shown in Tables 7 and 8.

A silver paste containing a $B_2O_3$—$SiO_2$—BaO-based glass frit was applied to both ends of each of the fired laminates and then baked at 600° C. in an $N_2$ atmosphere to form external electrodes electrically connected to the internal electrodes. Thereby, laminated ceramic capacitors including the dielectric ceramic material (2) of the present invention were produced.

The outer dimensions of each of the resulting multilayer ceramic capacitors (sample Nos. 101 to 192) were 5.0 mm in width, 5.7 mm in length, and 2.4 mm in thickness, similar to EXAMPLE 1. The dielectric ceramic layers each disposed between the internal electrodes each had a thickness of 1.0 μm. The number of effective dielectric ceramic layers was five layers. The area of each of the opposite electrodes was $16.3 \times 10^{-6}$ m² per layer.

Next, the electrical properties of the multilayer ceramic capacitors of sample Nos. 101 to 192 were measured. The relative dielectric constant $\epsilon_r$ and the dielectric loss (tan δ) were measured in the same methods as in EXAMPLE 1. Tables 9 and 10 show the results.

To measure insulation resistance R, an insulation resistance tester was used. That is, 4 V DC was applied for 1 minute, and the insulation resistance R was measured at +25° C., and then the resistivity ρ was calculated. Tables 9 and 10 show the results as log ρ.

With respect to the rate of change of capacitance C with temperature, the rate of change $\Delta C/C_{25° C.}$ in the range of −25° C. to +85° C. with reference to a capacitance at 25° C. was determined. Tables 9 and 10 show the results as the rate of change of the dielectric constant with temperature.

With respect to a high-temperature load test, 8 V DC was applied at 125° C. to 12 specimens of each sample, and a change in insulation resistance R with time was measured. In the high-temperature load test, a state in which the insulation resistance R of each sample reached $10^5 \Omega$ or less was defined as failure. After measurement of the time required for reaching failure, the mean time to failure was determined. Tables 9 and 10 show the results.

The average grain size was measured by the same method as in EXAMPLE 1.

TABLE 6

| Sample | x | m | Particle size of material |
|---|---|---|---|
| *A' | 0.042 | 1.003 | 0.12 |
| *B' | 0.020 | 0.996 | 0.13 |
| *C' | 0.010 | 1.031 | 0.11 |
| D' | 0.000 | 1.001 | 0.14 |
| E' | 0.005 | 1.001 | 0.15 |
| F' | 0.010 | 1.011 | 0.13 |
| G' | 0.020 | 1.004 | 0.13 |

TABLE 6-continued

| Sample | x | m | Particle size of material |
|---|---|---|---|
| H' | 0.039 | 1.007 | 0.14 |
| I' | 0.000 | 0.998 | 0.12 |
| J' | 0.000 | 1.017 | 0.14 |
| K' | 0.000 | 1.030 | 0.13 |

TABLE 7

| Sample | Rare-earth element | Powder used | x | m | a | b | c | d | e | Ra | Firing temperature [° C.] |
|---|---|---|---|---|---|---|---|---|---|---|---|
| *No. 101 | Gd | A' | 0.042 | 1.003 | 0.200 | 0.50 | 1.50 | 1.00 | 0.60 | 0.49 | 1220 |
| *No. 102 | Gd | B' | 0.020 | 0.996 | 0.200 | 0.50 | 1.50 | 1.00 | 0.60 | 0.42 | 1220 |
| *No. 103 | Gd | C' | 0.010 | 1.031 | 0.200 | 0.50 | 1.50 | 1.00 | 0.60 | 0.57 | 1220 |
| *No. 104 | Gd | D' | 0.000 | 1.001 | 0.008 | 0.50 | 1.50 | 1.00 | 0.60 | 0.41 | 1220 |
| *No. 105 | Gd | D' | 0.000 | 1.001 | 5.100 | 0.50 | 1.50 | 1.00 | 0.60 | 0.43 | 1220 |
| *No. 106 | Gd | D' | 0.000 | 1.001 | 0.200 | 0.045 | 1.50 | 1.00 | 0.60 | 0.28 | 1180 |
| *No. 107 | Gd | D' | 0.000 | 1.001 | 0.200 | 5.20 | 1.50 | 1.00 | 0.60 | 0.78 | 1260 |
| *No. 108 | Gd | D' | 0.000 | 1.001 | 0.200 | 0.50 | 0.18 | 1.00 | 0.60 | 0.59 | 1220 |
| *No. 109 | Gd | D' | 0.000 | 1.001 | 0.200 | 0.50 | 8.20 | 1.00 | 0.60 | 0.46 | 1220 |
| *No. 110 | Gd | D' | 0.000 | 1.001 | 0.200 | 0.50 | 1.50 | 0.00 | 0.60 | 0.72 | 1170 |
| *No. 111 | Gd | D' | 0.000 | 1.001 | 0.200 | 0.50 | 1.50 | 0.00 | 0.60 | 0.79 | 1200 |
| *No. 112 | Gd | D' | 0.000 | 1.001 | 0.200 | 0.50 | 1.50 | 0.00 | 0.60 | 0.93 | 1230 |
| *No. 113 | Gd | D' | 0.000 | 1.001 | 0.200 | 0.50 | 1.50 | 0.04 | 0.60 | 0.73 | 1190 |
| *No. 114 | Gd | D' | 0.000 | 1.001 | 0.200 | 0.50 | 1.50 | 0.04 | 0.60 | 0.81 | 1220 |
| *No. 115 | Gd | D' | 0.000 | 1.001 | 0.200 | 0.50 | 1.50 | 0.04 | 0.60 | 0.92 | 1250 |
| *No. 116 | Gd | D' | 0.000 | 1.001 | 0.200 | 0.50 | 1.50 | 3.10 | 0.60 | 0.27 | 1220 |
| *No. 117 | Gd | D' | 0.000 | 1.001 | 0.200 | 0.50 | 1.50 | 1.00 | 0.03 | 0.49 | 1220 |
| *No. 118 | Gd | D' | 0.000 | 1.001 | 0.200 | 0.50 | 1.50 | 1.00 | 2.60 | 0.43 | 1220 |
| No. 119 | Gd | E' | 0.005 | 1.001 | 0.200 | 0.50 | 1.50 | 1.00 | 0.60 | 0.60 | 1220 |
| No. 120 | Gd | F' | 0.010 | 1.011 | 0.200 | 0.50 | 1.50 | 1.00 | 0.60 | 0.53 | 1220 |
| No. 121 | Gd | G' | 0.020 | 1.004 | 0.200 | 0.50 | 1.50 | 1.00 | 0.60 | 0.38 | 1220 |
| No. 122 | Gd | H' | 0.039 | 1.007 | 0.200 | 0.50 | 1.50 | 1.00 | 0.60 | 0.46 | 1220 |
| No. 123 | Gd | I' | 0.000 | 0.998 | 0.200 | 0.50 | 1.50 | 1.00 | 0.60 | 0.48 | 1220 |
| No. 124 | Gd | J' | 0.000 | 1.017 | 0.200 | 0.50 | 1.50 | 1.00 | 0.60 | 0.60 | 1220 |
| No. 125 | Gd | K' | 0.000 | 1.030 | 0.200 | 0.50 | 1.50 | 1.00 | 0.60 | 0.54 | 1220 |
| No. 126 | Gd | D' | 0.000 | 1.001 | 0.010 | 0.50 | 1.50 | 1.00 | 0.60 | 0.54 | 1220 |
| No. 127 | Gd | D' | 0.000 | 1.001 | 0.030 | 0.50 | 1.50 | 1.00 | 0.60 | 0.49 | 1220 |
| No. 128 | Gd | D' | 0.000 | 1.001 | 0.100 | 0.50 | 1.50 | 1.00 | 0.60 | 0.55 | 1220 |
| No. 129 | Gd | D' | 0.000 | 1.001 | 0.400 | 0.50 | 1.50 | 1.00 | 0.60 | 0.45 | 1220 |
| No. 130 | Gd | D' | 0.000 | 1.001 | 0.700 | 0.50 | 1.50 | 1.00 | 0.60 | 0.35 | 1190 |
| No. 131 | Gd | D' | 0.000 | 1.001 | 1.500 | 0.50 | 1.50 | 1.00 | 0.60 | 0.57 | 1190 |
| No. 132 | Gd | D' | 0.000 | 1.001 | 3.600 | 0.50 | 1.50 | 1.00 | 0.60 | 0.41 | 1180 |
| No. 133 | Gd | D' | 0.000 | 1.001 | 5.000 | 0.50 | 1.50 | 1.00 | 0.60 | 0.55 | 1170 |
| No. 134 | Gd | D' | 0.000 | 1.001 | 0.200 | 0.05 | 1.50 | 1.00 | 0.60 | 0.50 | 1220 |
| No. 135 | Gd | D' | 0.000 | 1.001 | 0.200 | 0.20 | 1.50 | 1.00 | 0.60 | 0.42 | 1220 |
| No. 136 | Gd | D' | 0.000 | 1.001 | 0.200 | 0.80 | 1.50 | 1.00 | 0.60 | 0.57 | 1220 |
| No. 137 | Gd | D' | 0.000 | 1.001 | 0.200 | 1.30 | 1.50 | 1.00 | 0.60 | 0.36 | 1220 |
| No. 138 | Gd | D' | 0.000 | 1.001 | 0.200 | 3.20 | 1.50 | 1.00 | 0.60 | 0.43 | 1220 |
| No. 139 | Gd | D' | 0.000 | 1.001 | 0.200 | 5.00 | 1.50 | 1.00 | 0.60 | 0.58 | 1220 |
| No. 140 | Gd | D' | 0.000 | 1.001 | 0.200 | 0.50 | 0.20 | 1.00 | 0.60 | 0.48 | 1240 |
| No. 141 | Gd | D' | 0.000 | 1.001 | 0.200 | 0.50 | 0.50 | 1.00 | 0.60 | 0.43 | 1220 |
| No. 142 | Gd | D' | 0.000 | 1.001 | 0.200 | 0.50 | 1.20 | 1.00 | 0.60 | 0.52 | 1220 |
| No. 143 | Gd | D' | 0.000 | 1.001 | 0.200 | 0.50 | 2.70 | 1.00 | 0.60 | 0.36 | 1220 |
| No. 144 | Gd | D' | 0.000 | 1.001 | 0.200 | 0.50 | 5.80 | 1.00 | 0.60 | 0.44 | 1170 |
| No. 145 | Gd | D' | 0.000 | 1.001 | 0.200 | 0.50 | 8.00 | 1.00 | 0.60 | 0.49 | 1170 |
| No. 146 | Gd | D' | 0.000 | 1.001 | 0.200 | 0.50 | 1.50 | 0.05 | 0.60 | 0.37 | 1220 |
| No. 147 | Gd | D' | 0.000 | 1.001 | 0.200 | 0.50 | 1.50 | 0.20 | 0.60 | 0.39 | 1180 |
| No. 148 | Gd | D' | 0.000 | 1.001 | 0.200 | 0.50 | 1.50 | 0.20 | 0.60 | 0.48 | 1210 |
| No. 149 | Gd | D' | 0.000 | 1.001 | 0.200 | 0.50 | 1.50 | 0.20 | 0.60 | 0.55 | 1240 |
| No. 150 | Gd | D' | 0.000 | 1.001 | 0.200 | 0.50 | 1.50 | 0.50 | 0.60 | 0.53 | 1200 |

TABLE 8

| Sample | Rare-earth element | Powder used | x | m | a | b | c | d | e | Ra | Firing temperature [° C.] |
|---|---|---|---|---|---|---|---|---|---|---|---|
| No. 151 | Gd | D' | 0.000 | 1.001 | 0.200 | 0.50 | 1.50 | 1.20 | 0.60 | 0.45 | 1190 |
| No. 152 | Gd | D' | 0.000 | 1.001 | 0.200 | 0.50 | 1.50 | 1.20 | 0.60 | 0.51 | 1220 |
| No. 153 | Gd | D' | 0.000 | 1.001 | 0.200 | 0.50 | 1.50 | 1.20 | 0.60 | 0.55 | 1250 |
| No. 154 | Gd | D' | 0.000 | 1.001 | 0.200 | 0.50 | 1.50 | 1.90 | 0.60 | 0.48 | 1220 |
| No. 155 | Gd | D' | 0.000 | 1.001 | 0.200 | 0.50 | 1.50 | 2.50 | 0.60 | 0.50 | 1220 |
| No. 156 | Gd | D' | 0.000 | 1.001 | 0.200 | 0.50 | 1.50 | 3.00 | 0.60 | 0.48 | 1170 |
| No. 157 | Gd | D' | 0.000 | 1.001 | 0.200 | 0.50 | 1.50 | 1.00 | 0.05 | 0.42 | 1220 |
| No. 158 | Gd | D' | 0.000 | 1.001 | 0.200 | 0.50 | 1.50 | 1.00 | 0.25 | 0.54 | 1220 |
| No. 159 | Gd | D' | 0.000 | 1.001 | 0.200 | 0.50 | 1.50 | 1.00 | 0.70 | 0.55 | 1220 |
| No. 160 | Gd | D' | 0.000 | 1.001 | 0.200 | 0.50 | 1.50 | 1.00 | 1.00 | 0.47 | 1220 |
| No. 161 | Gd | D' | 0.000 | 1.001 | 0.200 | 0.50 | 1.50 | 1.00 | 1.70 | 0.52 | 1220 |
| No. 162 | Gd | D' | 0.000 | 1.001 | 0.200 | 0.50 | 1.50 | 1.00 | 2.50 | 0.48 | 1220 |
| No. 163 | Y | D' | 0.000 | 1.001 | 0.200 | 0.50 | 1.50 | 1.00 | 0.60 | 0.49 | 1220 |
| No. 164 | Y | D' | 0.000 | 1.001 | 0.200 | 0.50 | 1.50 | 1.00 | 1.70 | 0.55 | 1220 |
| No. 165 | La | D' | 0.000 | 1.001 | 0.200 | 0.50 | 1.50 | 1.00 | 0.60 | 0.50 | 1220 |
| No. 166 | La | D' | 0.000 | 1.001 | 0.200 | 0.50 | 1.50 | 1.00 | 1.70 | 0.40 | 1220 |
| No. 167 | Ce | D' | 0.000 | 1.001 | 0.200 | 0.50 | 1.50 | 1.00 | 0.60 | 0.51 | 1220 |
| No. 168 | Ce | D' | 0.000 | 1.001 | 0.200 | 0.50 | 1.50 | 1.00 | 1.70 | 0.48 | 1220 |
| No. 169 | Nd | D' | 0.000 | 1.001 | 0.200 | 0.50 | 1.50 | 1.00 | 0.60 | 0.41 | 1220 |
| No. 170 | Nd | D' | 0.000 | 1.001 | 0.200 | 0.50 | 1.50 | 1.00 | 1.70 | 0.47 | 1245 |
| No. 171 | Eu | D' | 0.000 | 1.001 | 0.200 | 0.50 | 1.50 | 1.00 | 0.60 | 0.57 | 1220 |
| No. 172 | Eu | D' | 0.000 | 1.001 | 0.200 | 0.50 | 1.50 | 1.00 | 1.70 | 0.59 | 1220 |
| No. 173 | Sm | D' | 0.000 | 1.001 | 0.200 | 0.50 | 1.50 | 1.00 | 0.60 | 0.50 | 1220 |
| No. 174 | Sm | D' | 0.000 | 1.001 | 0.200 | 0.50 | 1.50 | 1.00 | 1.70 | 0.59 | 1220 |
| No. 175 | Tb | D' | 0.000 | 1.001 | 0.200 | 0.50 | 1.50 | 1.00 | 0.60 | 0.58 | 1220 |
| No. 176 | Tb | D' | 0.000 | 1.001 | 0.200 | 0.50 | 1.50 | 1.00 | 1.70 | 0.38 | 1220 |
| No. 177 | Dy | D' | 0.000 | 1.001 | 0.200 | 0.50 | 1.50 | 1.00 | 0.60 | 0.52 | 1220 |
| No. 178 | Dy | D' | 0.000 | 1.001 | 0.200 | 0.50 | 1.50 | 1.00 | 1.70 | 0.48 | 1220 |
| No. 179 | Ho | D' | 0.000 | 1.001 | 0.200 | 0.50 | 1.50 | 1.00 | 0.60 | 0.43 | 1220 |
| No. 180 | Ho | D' | 0.000 | 1.001 | 0.200 | 0.50 | 1.50 | 1.00 | 1.70 | 0.59 | 1220 |
| No. 181 | Er | D' | 0.000 | 1.001 | 0.200 | 0.50 | 1.50 | 1.00 | 0.60 | 0.51 | 1220 |
| No. 182 | Er | D' | 0.000 | 1.001 | 0.200 | 0.50 | 1.50 | 1.00 | 1.70 | 0.39 | 1220 |
| No. 183 | Tm | D' | 0.000 | 1.001 | 0.200 | 0.50 | 1.50 | 1.00 | 0.60 | 0.44 | 1220 |
| No. 184 | Tm | D' | 0.000 | 1.001 | 0.200 | 0.50 | 1.50 | 1.00 | 1.70 | 0.60 | 1220 |
| No. 185 | Yb | D' | 0.000 | 1.001 | 0.200 | 0.50 | 1.50 | 1.00 | 0.60 | 0.57 | 1220 |
| No. 186 | Yb | D' | 0.000 | 1.001 | 0.200 | 0.50 | 1.50 | 1.00 | 1.70 | 0.50 | 1220 |
| No. 187 | Lu | D' | 0.000 | 1.001 | 0.200 | 0.50 | 1.50 | 1.00 | 0.60 | 0.57 | 1220 |
| No. 188 | Lu | D' | 0.000 | 1.001 | 0.200 | 0.50 | 1.50 | 1.00 | 1.70 | 0.38 | 1220 |
| No. 189 | Gd + Ho (0.3 each) | D' | 0.000 | 1.001 | 0.200 | 0.50 | 1.50 | 1.00 | 0.60 | 0.46 | 1220 |
| No. 190 | Gd + Ho (0.85 each) | D' | 0.000 | 1.001 | 0.200 | 0.50 | 1.50 | 1.00 | 1.70 | 0.40 | 1220 |
| No. 191 | Dy + Lu (0.3 each) | D' | 0.000 | 1.001 | 0.200 | 0.50 | 1.50 | 1.00 | 0.60 | 0.47 | 1220 |
| No. 192 | Dy + Lu (0.85 each) | D' | 0.000 | 1.001 | 0.200 | 0.50 | 1.50 | 1.00 | 1.70 | 0.37 | 1220 |

TABLE 9

| Sample | Relative dielectric constant $\epsilon_r$ | tan δ [%] | Rate of change of dielectric constant with temperature [%] | Resistivity Log ρ  ρ: Ωm | Mean time to failure [hour] |
|---|---|---|---|---|---|
| *No. 101 | 5420 | 7.7 | −13.1 | 11.2 | 140 |
| *No. 102 | 6340 | 7.3 | −13.3 | 9.2 | Un-measurable |
| *No. 103 | 3960 | 8.9 | −16.3 | 11.2 | Un-measurable |
| *No. 104 | 6590 | 7.6 | −13.4 | 9.9 | Un-measurable |
| *No. 105 | 6530 | 6.8 | −15.6 | 10.2 | 120 |
| *No. 106 | 5420 | 6.3 | −12.8 | 11.1 | 20 |
| *No. 107 | 6300 | 6.8 | −16.2 | 10.7 | 140 |
| *No. 108 | 3900 | 12.1 | −17.1 | 9.4 | 15 |
| *No. 109 | 6820 | 7.7 | −12.9 | 10.2 | 40 |
| *No. 110 | 7040 | 8.2 | −14.5 | 10.8 | 120 |
| *No. 111 | 7590 | 9.5 | −15.2 | 10.7 | 140 |
| *No. 112 | 8300 | 10.8 | −15.7 | 11.0 | 130 |
| *No. 113 | 7420 | 8.3 | −15.2 | 11.0 | 140 |
| *No. 114 | 8030 | 9.5 | −15.7 | 11.1 | 120 |
| *No. 115 | 8540 | 10.2 | −16.2 | 11.2 | 150 |
| *No. 116 | 5210 | 6.8 | −12.6 | 10.9 | 110 |
| *No. 117 | 6810 | 8.5 | −13.1 | 11.2 | Un-measurable |
| *No. 118 | 6500 | 7.3 | −16.2 | 11.2 | 120 |
| No. 119 | 7350 | 8.7 | −13.9 | 10.9 | 140 |
| No. 120 | 7170 | 8.5 | −13.6 | 10.8 | 140 |
| No. 121 | 6430 | 6.4 | −12.9 | 10.8 | 120 |
| No. 122 | 6560 | 8.2 | −12.9 | 11.1 | 130 |
| No. 123 | 6810 | 7.9 | −13.4 | 10.8 | 150 |
| No. 124 | 7490 | 9.8 | −14.4 | 10.8 | 110 |
| No. 125 | 7110 | 8.0 | −14.3 | 11.2 | 140 |
| No. 126 | 7190 | 9.1 | −13.4 | 11.0 | 130 |
| No. 127 | 6880 | 8.1 | −13.2 | 10.8 | 130 |
| No. 128 | 7200 | 8.5 | −13.7 | 11.0 | 170 |
| No. 129 | 6600 | 7.2 | −13.5 | 10.8 | 110 |
| No. 130 | 6310 | 6.1 | −12.6 | 11.3 | 140 |

TABLE 9-continued

| Sample | Relative dielectric constant $\epsilon_r$ | tan δ [%] | Rate of change of dielectric constant with temperature [%] | Resistivity Log ρ ρ: Ωm | Mean time to failure [hour] |
|---|---|---|---|---|---|
| No. 131 | 7270 | 9.6 | −13.6 | 11.2 | 160 |
| No. 132 | 6390 | 7.3 | −12.8 | 10.8 | 140 |
| No. 133 | 7180 | 8.9 | −14.3 | 11.2 | 150 |
| No. 134 | 6790 | 7.8 | −13.1 | 10.8 | 150 |
| No. 135 | 6460 | 7.3 | −13.5 | 11.1 | 130 |
| No. 136 | 7320 | 9.2 | −13.7 | 10.8 | 140 |
| No. 137 | 6270 | 6.4 | −12.8 | 11.2 | 140 |
| No. 138 | 6640 | 8.0 | −13.3 | 11.0 | 180 |
| No. 139 | 7280 | 9.5 | −14.7 | 11.2 | 180 |
| No. 140 | 6690 | 7.7 | −13.1 | 10.9 | 160 |
| No. 141 | 6630 | 8.1 | −13.6 | 11.2 | 160 |
| No. 142 | 6970 | 9.1 | −13.7 | 11.0 | 140 |
| No. 143 | 6290 | 6.5 | −12.5 | 10.8 | 130 |
| No. 144 | 6700 | 8.2 | −12.8 | 11.3 | 150 |
| No. 145 | 6750 | 8.9 | −13.0 | 10.9 | 130 |
| No. 146 | 6210 | 7.1 | −13.0 | 11.2 | 120 |
| No. 147 | 6300 | 7.3 | −14.1 | 11.2 | 160 |
| No. 148 | 6480 | 8.4 | −12.9 | 10.8 | 130 |
| No. 149 | 6900 | 9.2 | −14.2 | 10.7 | 120 |
| No. 150 | 7170 | 9.1 | −13.9 | 11.2 | 170 |

TABLE 10

| Sample | Relative dielectric constant $\epsilon_r$ | tan δ [%] | Rate of change of dielectric constant with temperature [%] | Resistivity Log ρ ρ: Ωm | Mean time to failure [hour] |
|---|---|---|---|---|---|
| No. 151 | 7020 | 7.8 | −13.8 | 10.7 | 110 |
| No. 152 | 7240 | 8.8 | −13.9 | 10.9 | 170 |
| No. 153 | 7490 | 9.0 | −13.9 | 10.8 | 110 |
| No. 154 | 6850 | 7.8 | −13.7 | 11.1 | 180 |
| No. 155 | 7040 | 8.4 | −14.1 | 10.8 | 120 |
| No. 156 | 6690 | 8.2 | −13.9 | 10.7 | 150 |
| No. 157 | 6660 | 7.8 | −12.6 | 10.8 | 170 |
| No. 158 | 7050 | 9.0 | −14.1 | 11.2 | 110 |
| No. 159 | 7260 | 8.6 | −13.9 | 11.2 | 110 |
| No. 160 | 6660 | 8.6 | −13.3 | 10.7 | 150 |
| No. 161 | 6780 | 8.6 | −13.4 | 10.8 | 120 |
| No. 162 | 6910 | 8.0 | −13.9 | 10.9 | 170 |
| No. 163 | 6880 | 8.0 | −13.6 | 11.3 | 170 |
| No. 164 | 7290 | 8.6 | −14.5 | 10.7 | 110 |
| No. 165 | 6830 | 8.2 | −13.8 | 11.1 | 110 |
| No. 166 | 6450 | 6.7 | −13.3 | 10.9 | 170 |
| No. 167 | 6850 | 9.0 | −13.3 | 10.8 | 130 |
| No. 168 | 6850 | 7.9 | −13.1 | 11.3 | 120 |
| No. 169 | 6510 | 7.3 | −13.1 | 10.9 | 130 |
| No. 170 | 6600 | 7.9 | −13.0 | 10.9 | 110 |
| No. 171 | 7240 | 8.9 | −14.1 | 10.9 | 150 |
| No. 172 | 7400 | 9.1 | −14.4 | 11.1 | 110 |
| No. 173 | 7020 | 8.9 | −13.3 | 10.7 | 120 |
| No. 174 | 7200 | 9.1 | −13.9 | 10.9 | 150 |
| No. 175 | 7200 | 9.6 | −13.6 | 11.0 | 160 |
| No. 176 | 6460 | 7.7 | −12.8 | 11.2 | 130 |
| No. 177 | 6900 | 8.8 | −14.1 | 11.0 | 160 |
| No. 178 | 6810 | 7.9 | −13.6 | 11.0 | 160 |
| No. 179 | 6450 | 7.1 | −13.1 | 11.2 | 130 |
| No. 180 | 7220 | 9.3 | −14.6 | 11.1 | 110 |
| No. 181 | 7080 | 7.6 | −14.2 | 11.3 | 110 |
| No. 182 | 6410 | 6.7 | −12.9 | 11.1 | 160 |
| No. 183 | 6730 | 8.0 | −13.0 | 10.9 | 110 |
| No. 184 | 7500 | 9.7 | −14.0 | 11.2 | 170 |
| No. 185 | 7240 | 9.5 | −14.4 | 11.3 | 180 |
| No. 186 | 7020 | 8.5 | −13.9 | 10.8 | 150 |
| No. 187 | 7220 | 8.8 | −13.6 | 11.2 | 160 |
| No. 188 | 6250 | 7.4 | −13.2 | 11.2 | 120 |
| No. 189 | 6590 | 8.2 | −12.9 | 11.0 | 150 |
| No. 190 | 6320 | 7.0 | −12.5 | 10.9 | 120 |
| No. 191 | 6620 | 7.9 | −13.3 | 11.2 | 150 |
| No. 192 | 6290 | 6.3 | −12.9 | 10.8 | 180 |

As is clear from the measurement results shown in Tables 9 and 10, all of the multilayer ceramic capacitors sample Nos. 119 to 192, each including dielectric ceramic material (2) having a composition within the range of the present invention, was found to be a high-reliability, high-dielectric multilayer ceramic capacitor having a mean time to failure of 100 hours or more in the high-temperature load test, a high dielectric constant $\epsilon_r$ of 6000 or more, a small dielectric loss (tan δ) of 10% or less, a rate of change of the dielectric constant with temperature meeting the X5R characteristics (within ±15%), and a high resistivity ρ of $10^{10.5}$ Ωm (log ρ=10.5) or more, in spite of the fact that the thickness of the dielectric ceramic layer was reduced to about 1 μm.

It was found that in the case where the molar ratio d of MgO was in the range of 0.05≦d≦3.0 relative to 100 of (Ba,Ca)TiO₃, even when each of sample Nos. 147 to 149 having the same composition was fired at a firing temperature range between 1180° C. and 1240° C., a difference in temperature of 60° C., the change in relative dielectric constant $\epsilon_r$ was small to achieve stable quality without the nonuniformity in electrical properties.

Furthermore, as is clear from the case of sample Nos. 189 to 192, in the case where the molar ratio d, which was the total of the molar ratios of two rare-earth element oxides, was in the range of 0.05≦e≦2.5 relative to 100 of (Ba,Ca) TiO₃, it was possible to obtain the multilayer ceramic capacitors having satisfactory electrical properties in the same way as in other sample Nos. 119 to 188 each containing a single type of rare-earth element oxide, even when the dielectric ceramic layers each have a small thickness of about 1 μm.

In contrast, as is clear from the measurement results shown in Table 9, it was found that if any one of contents of the oxides was outside the range of the present invention, the resulting multilayer ceramic capacitors had degraded electrical properties even if each of the contents of the other oxides was within the range of the present invention, as described below.

In the case of sample No. 101 using sample A' in which Ba ions in $(Ba_{1-x}Ca_x)_mTiO_3$ were partially replaced with Ca ions and the substitution rate x of Ca ions was 0.04 or more, the relative dielectric constant $\epsilon_r$ was 5420, which was less than 6000.

In the case of sample No. 102 using sample B' in which the ratio m, i.e., $Ba_{1-x}Ca_x/Ti$, was less than 0.998, the resistivity ρ was $10^{9.2}$ Ωm, which was less than $10^{10.5}$ Ωm. The mean time to failure was too short to be measured. In the case of sample No. 103 using sample C' in which the ratio m exceeded 1.030, the relative dielectric constant $\epsilon_r$ was 3960, which was significantly lower than 6000. The rate of change of the dielectric constant with temperature was −16.3%, which was outside the range of ±15%. The mean time to failure was too short to be measured.

In the case of sample No. 104 in which the molar ratio a of MnO was less than 0.01 relative to 100 of $(Ba_{1-x}Ca_x)_mTiO_3$, the resistivity ρ was $10^{9.9}$ Ωm, which was less than $10^{10.5}$ Ωm. In the case of sample No. 105 in which the molar ratio a exceeded 5, the rate of change of the dielectric constant with temperature was −15.6%, which was outside the range of ±15%. The resistivity ρ was $10^{10.2}$ Ωm, which was less than $10^{10.5}$ Ωm.

In the case of sample No. 106 in which the molar amount b of CuO was less than 0.05, the relative dielectric constant $\epsilon_r$ was 5420, which was less than 6000. The mean time to failure was as short as 20 hours. In the case of sample No. 107 in which the molar amount b exceeded 5, the rate of change of the dielectric constant with temperature was −16.2%, which was outside the range of ±15%.

In the case of sample No. 108 in which the molar amount c of $SiO_2$ was less than 0.2, the relative dielectric constant $\epsilon_r$ was 3900, which was less than 6000. The dielectric loss (tan δ) was 12.1%, which exceeded 10%. The rate of change of the dielectric constant with temperature was −17.1%, which was outside the range of ±15%. The Re ρ was $10^{9.4}$ Ωm, which was less than $10^{10.5}$ Ωm. The mean time to failure was as short as 15 hours. In the case of sample No. 109 in which the molar amount c exceeded 8, the mean time to failure was as short as 40 hours.

In cases of sample Nos. 110 to 115 in which the molar amounts d were each less than 0.05, each average grain size exceeded 0.65 μm. When the firing temperature was changed from 1170° C. to 1230° C., a difference in temperature of 60° C., the change in relative dielectric constant $\epsilon_r$ was 1000 or more to cause the nonuniformity in electrical properties. In the case of sample No. 17 in which the molar amount d exceeded 3, the average grain size was as small as 0.27 μm. The relative dielectric constant $\epsilon_r$ was 5210, which was less than 6000.

In the case of sample No. 117 in which the molar amount e of RO was less than 0.05, the mean time to failure was too short to be measured. In the case of sample No. 118 in which the molar amount d exceeded 2.5, the rate of change of the dielectric constant with temperature was −16.2%, which was outside the range of ±15%.

The present invention is not limited to the above-described examples. Many widely different embodiments of the invention may be made without departing from the spirit thereof. For example, at least one element selected from a plurality of rare-earth elements is used. However, when a plurality of types of the rare-earth elements were used, the total amount d of the plurality of types of oxides thereof may satisfy the relationship: $0.05 \leq d \leq 2.5$.

INDUSTRIAL APPLICABILITY

The present invention can be applied to a multilayer ceramic capacitor for a circuit board used in an electronic device or the like.

The invention claimed is:

1. A dielectric ceramic material comprising the composition: $100(Ba_{1-x}Ca_x)_mTiO_3+aMnO+bCuO+cSiO_2+dMgO+eRO$, wherein coefficients 100, a, b, c, d, and e each represent mols; m represents the molar ratio of $(Ba_{1-x}—Ca_x)$ to Ti; and RO represents at least one rare-earth element oxide selected from the group consisting of $Y_2O_3$, $La_2O_3$, $2CeO_2$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$, wherein m, x, a, b, c, d, and e satisfy the relationships: $0.998 \leq m \leq 1.030$, $0 \leq x \leq 0.15$, $0.01 \leq a \leq 5$, $0.05 \leq b \leq 5$, $0.2 \leq c \leq 8$, $0.05 \leq d \leq 3.0$, and $0.05 \leq e \leq 2.5$, and wherein the dielectric ceramic material has an average grain size of 0.3 μm to 0.7 μm.

2. A dielectric ceramic material according to claim 1, wherein RO is a single member of said group.

3. A dielectric ceramic material according to claim 1, wherein RO is at least two members of said group.

4. A dielectric ceramic material according to claim 1, wherein $0.04 \leq x \leq 0.15$.

5. A dielectric ceramic material according to claim 4, wherein RO is a single member of said group.

6. A dielectric ceramic material according to claim 4, wherein RO is at least two members of said group.

7. A dielectric ceramic material according to claim 4, wherein RO comprises $Sm_2O_3$ or $Gd_2O_3$, $1.002 \leq m \leq 1.02$, $0.05 \leq x \leq 0.125$, $0.15 \leq a \leq 3.5$, $0.15 \leq b \leq 3$, $0.6 \leq c \leq 6.5$, $0.15 \leq d \leq 1$, and $0.25 \leq e \leq 1.7$, and wherein the dielectric ceramic material has an average grain size of 0.39 μm to 0.62 μm.

8. A dielectric ceramic material according to claim 2, wherein $0 \leq x < 0.04$ and the dielectric ceramic material has an average grain size of 0.35 μm to 0.65 μm.

9. A dielectric ceramic material according to claim 8, wherein RO is a single member of said group.

10. A dielectric ceramic material according to claim 8, wherein RO is at least two members of said group.

11. A dielectric ceramic material according to claim 4, wherein RO comprises $Sm_2O_3$ or $Gd_2O_3$, $1.002 \leq m \leq 1.02$, $0 \leq x \leq 0.125$, $0.15 \leq a \leq 3.5$, $0.15 \leq b \leq 3$, $0.6 \leq c \leq 6.5$, $0.15 \leq d \leq 1$, and $0.25 \leq e \leq 1.7$, and wherein the dielectric ceramic material has an average grain size of 0.39 μm to 0.62 μm.

12. A multilayer ceramic capacitor comprising a plurality of superposed dielectric ceramic layers; a pair of internal electrodes, each being disposed between a pair of dielectric ceramic layers; and a pair of external electrodes, each electrically connected to a different one of the internal electrodes, wherein the dielectric ceramic layers comprise the dielectric ceramic material according to claim 11.

13. A multilayer ceramic capacitor comprising a plurality of superposed dielectric ceramic layers; a pair of internal electrodes, each being disposed between a pair of dielectric ceramic layers; and a pair of external electrodes, each electrically connected to a different one of the internal electrodes, wherein the dielectric ceramic layers comprise the dielectric ceramic material according to claim 8.

14. The multilayer ceramic capacitor according to claim 13, wherein the internal electrodes comprise at least one conductive material selected from the group consisting of nickel, nickel alloy, copper, and copper alloy.

15. A multilayer ceramic capacitor comprising a plurality of superposed dielectric ceramic layers; a pair of internal electrodes, each being disposed between a pair of dielectric ceramic layers; and a pair of external electrodes, each electrically connected to a different one of the internal electrodes, wherein the dielectric ceramic layers comprise the dielectric ceramic material according to claim 7.

16. A multilayer ceramic capacitor comprising a plurality of superposed dielectric ceramic layers; a pair of internal electrodes, each being disposed between a pair of dielectric ceramic layers; and a pair of external electrodes, each electrically connected to a different one of the internal electrodes, wherein the dielectric ceramic layers comprise the dielectric ceramic material according to claim 4.

17. The multilayer ceramic capacitor according to claim 16, wherein the internal electrodes comprise at least one conductive material selected from the group consisting of nickel, nickel alloy, copper, and copper alloy.

18. A multilayer ceramic capacitor comprising a plurality of superposed dielectric ceramic layers; a pair of internal electrodes, each being disposed between a pair of dielectric ceramic layers; and a pair of external electrodes, each electrically connected to a different one of the internal electrodes, wherein the dielectric ceramic layers comprise the dielectric ceramic material according to claim 1.

19. The multilayer ceramic capacitor according to claim 18, wherein the internal electrodes comprise at least one conductive material selected from the group consisting of nickel, nickel alloy, copper, and copper alloy.

* * * * *